(12) United States Patent
Dussau

(10) Patent No.: US 11,980,161 B2
(45) Date of Patent: May 14, 2024

(54) MONITORING AND INTERVENING ASSEMBLY FOR REARING PREMISES

(71) Applicants: DUSSAU DISTRIBUTION, Pecorade (FR); Christian Dussau, Samadet (FR)

(72) Inventor: Christian Dussau, Samadet (FR)

(73) Assignee: DUSSAU DISTRIBUTION, Pecorade (FR)

( * ) Notice: Subject to any disclaimer, the term of this patent is extended or adjusted under 35 U.S.C. 154(b) by 420 days.

(21) Appl. No.: 17/292,968

(22) PCT Filed: Nov. 13, 2019

(86) PCT No.: PCT/IB2019/059759
§ 371 (c)(1),
(2) Date: May 11, 2021

(87) PCT Pub. No.: WO2020/100068
PCT Pub. Date: May 22, 2020

(65) Prior Publication Data
US 2022/0000068 A1    Jan. 6, 2022

(30) Foreign Application Priority Data

Nov. 13, 2018  (FR) ...................... 1871549

(51) Int. Cl.
A01K 1/01      (2006.01)
A01K 1/015     (2006.01)
A01K 29/00     (2006.01)

(52) U.S. Cl.
CPC ............ *A01K 1/0152* (2013.01); *A01K 29/00* (2013.01)

(58) Field of Classification Search
CPC .... A01K 1/0152; A01K 29/00; A01K 29/005; A01K 5/0266; A01K 1/015
(Continued)

(56) References Cited

U.S. PATENT DOCUMENTS 8,837,928 B1 *  9/2014  Clearman .............. G03B 17/02
                                                     396/25
11,064,647 B2   7/2021  Altomare
(Continued)

FOREIGN PATENT DOCUMENTS

EP      3 066 916        9/2016
WO      2014/141313 A2   9/2014
(Continued)

OTHER PUBLICATIONS

International Search Report for PCT/IB2019/059759 dated Feb. 13, 2020, 5 pages with English Translation.
(Continued)

Primary Examiner — Omar Casillashernandez
(74) Attorney, Agent, or Firm — NIXON & VANDERHYE

(57) ABSTRACT

A monitoring and intervening assembly for rearing premises includes: a movable monitoring unit equipped with a unit for monitoring the rearing premises and the animals resident therein, the geographic coordinates of the unit in the premises being determinable with respect to an origin, at least one movable intervening module able to be driven and controlled by the monitoring unit, the intervening module, at rest, being installed in a storage area, the monitoring unit and the intervening module both including interacting mechanical coupling for linking one to the other, the coupling being lockable and unlockable, the monitoring unit being able to continuously monitor the premises and the animals, without however being coupled to the or one of the intervening modules.

24 Claims, 20 Drawing Sheets

(58) Field of Classification Search
USPC .................................................... 340/573.3
See application file for complete search history.

(56) References Cited

U.S. PATENT DOCUMENTS

| | | | | |
|---|---|---|---|---|
| 2003/0070622 A1* | 4/2003 | Vaags | ................. | A01K 61/80 |
| | | | | 119/51.11 |
| 2004/0093843 A1* | 5/2004 | Tonutti | ............... | A01D 78/146 |
| | | | | 56/377 |
| 2016/0116828 A1* | 4/2016 | Clearman | ........... | G03B 17/566 |
| | | | | 396/428 |

FOREIGN PATENT DOCUMENTS

| WO | 2017/141155 | | 8/2017 |
|---|---|---|---|
| WO | WO-2017141155 A1 | * | 8/2017 |
| WO | 2018/015519 A1 | | 1/2018 |

OTHER PUBLICATIONS

Written Opinion of the ISA for PCT/IB2019/059759 dated Feb. 13, 2020, 9 pages with English Translation.

* cited by examiner

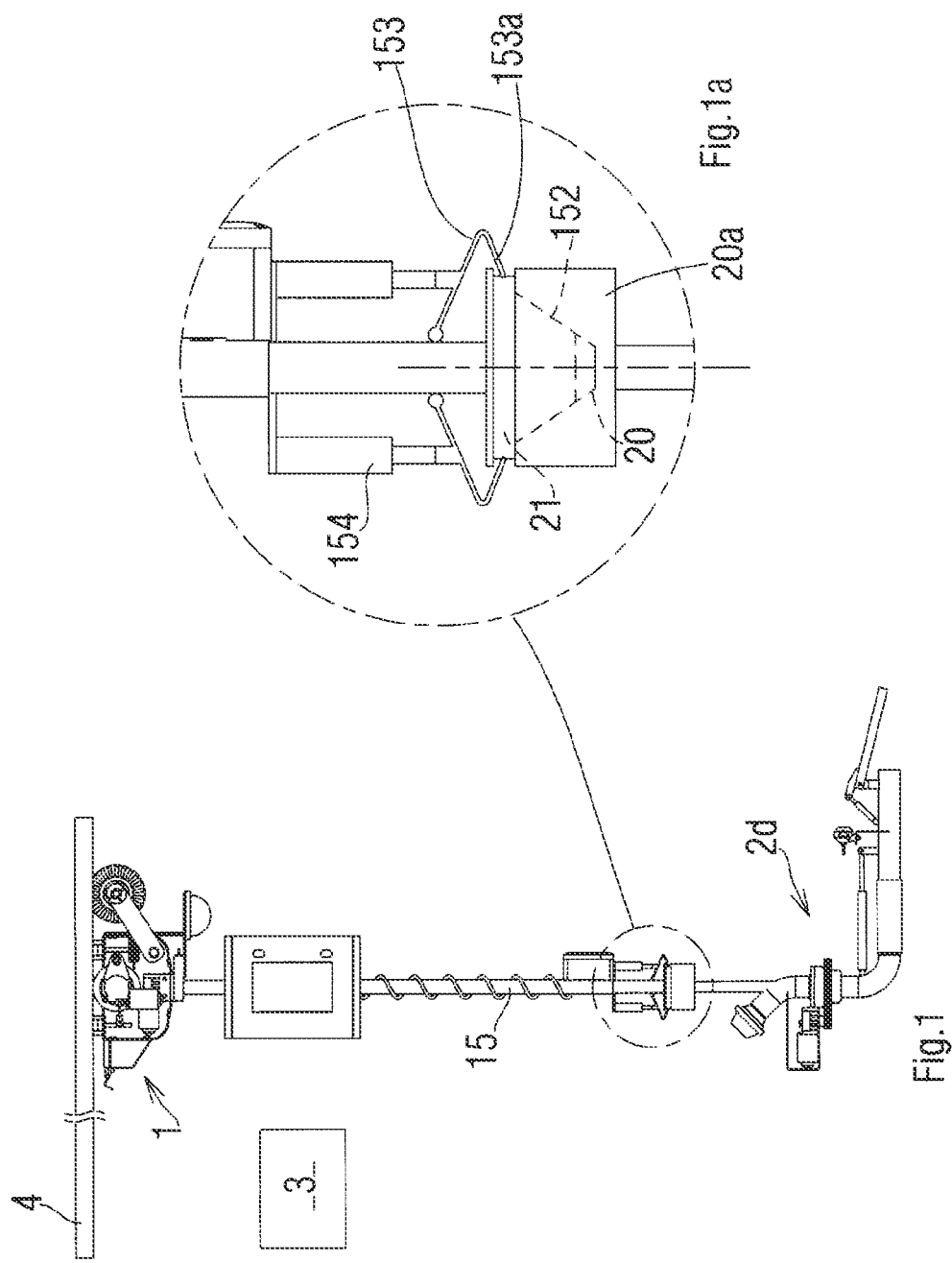

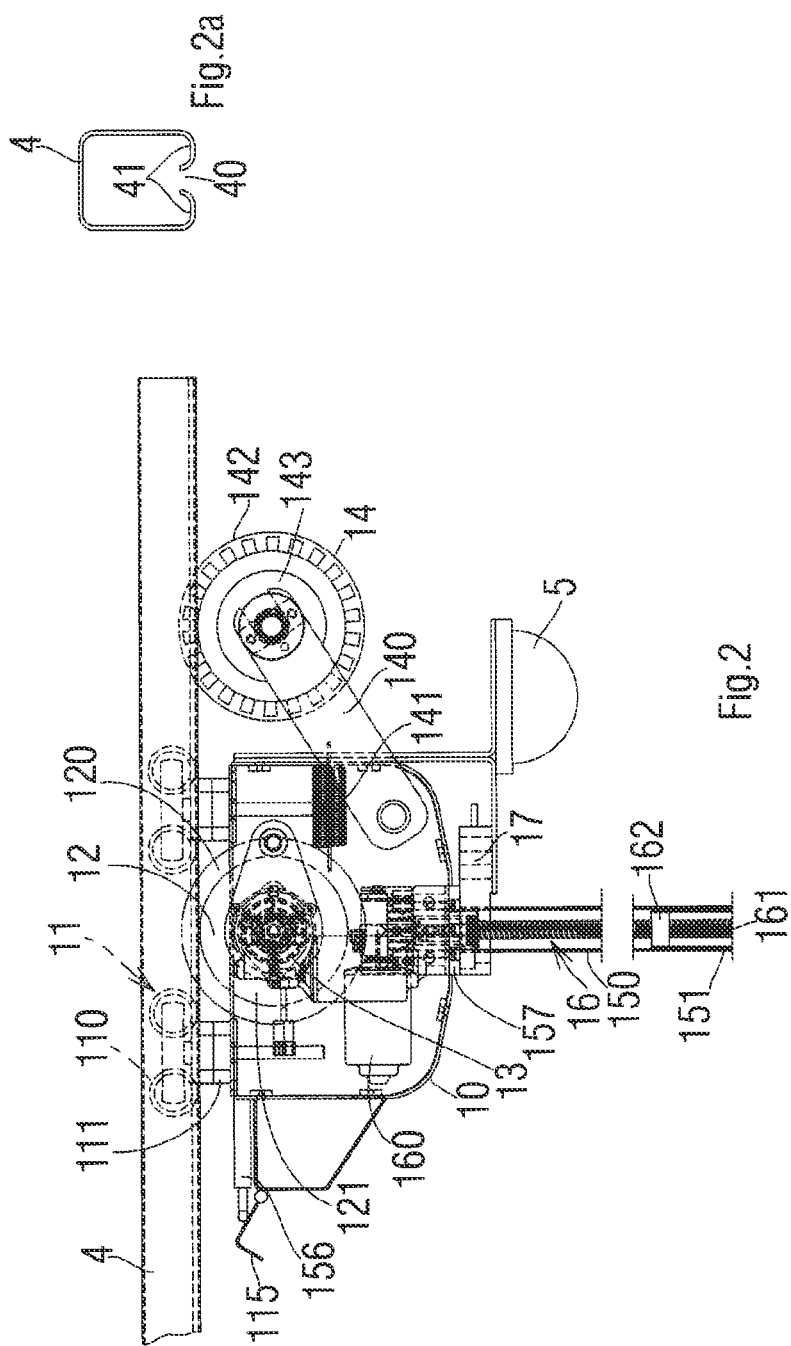

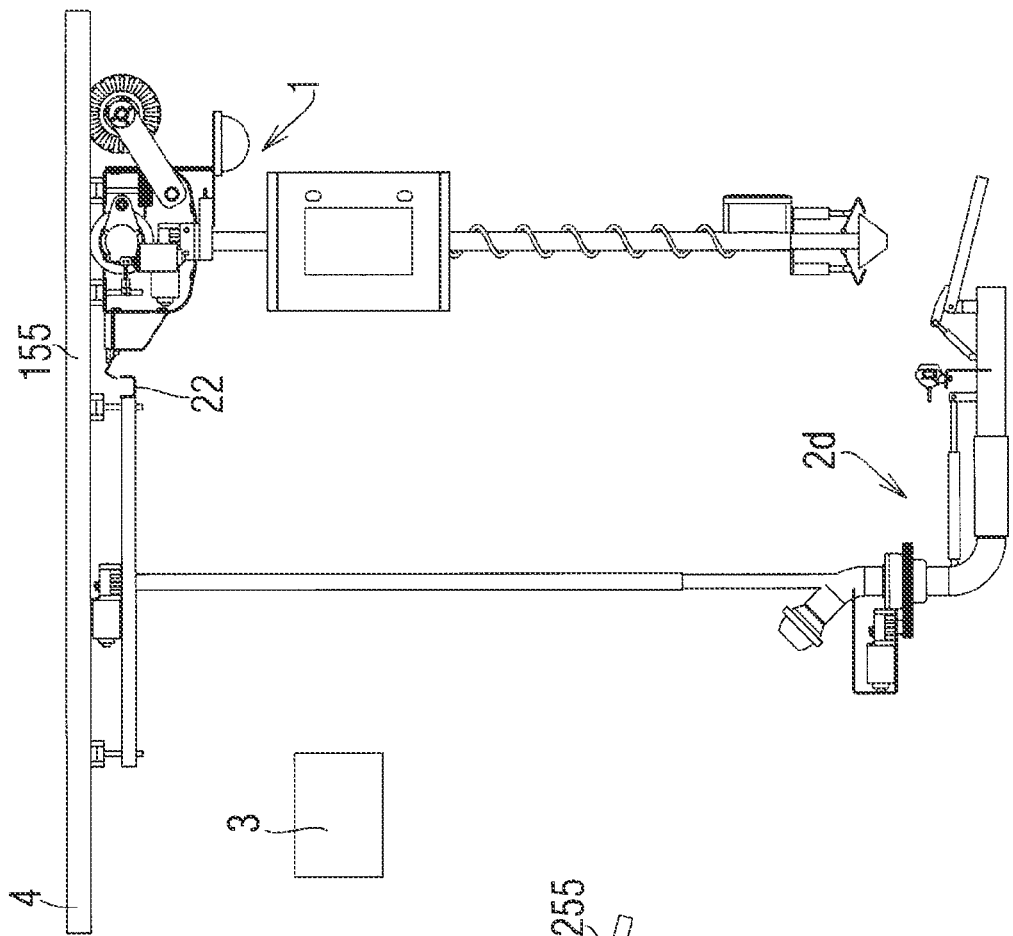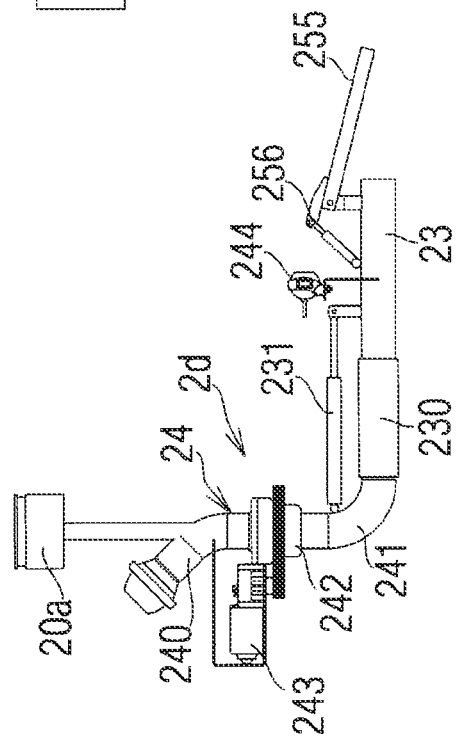

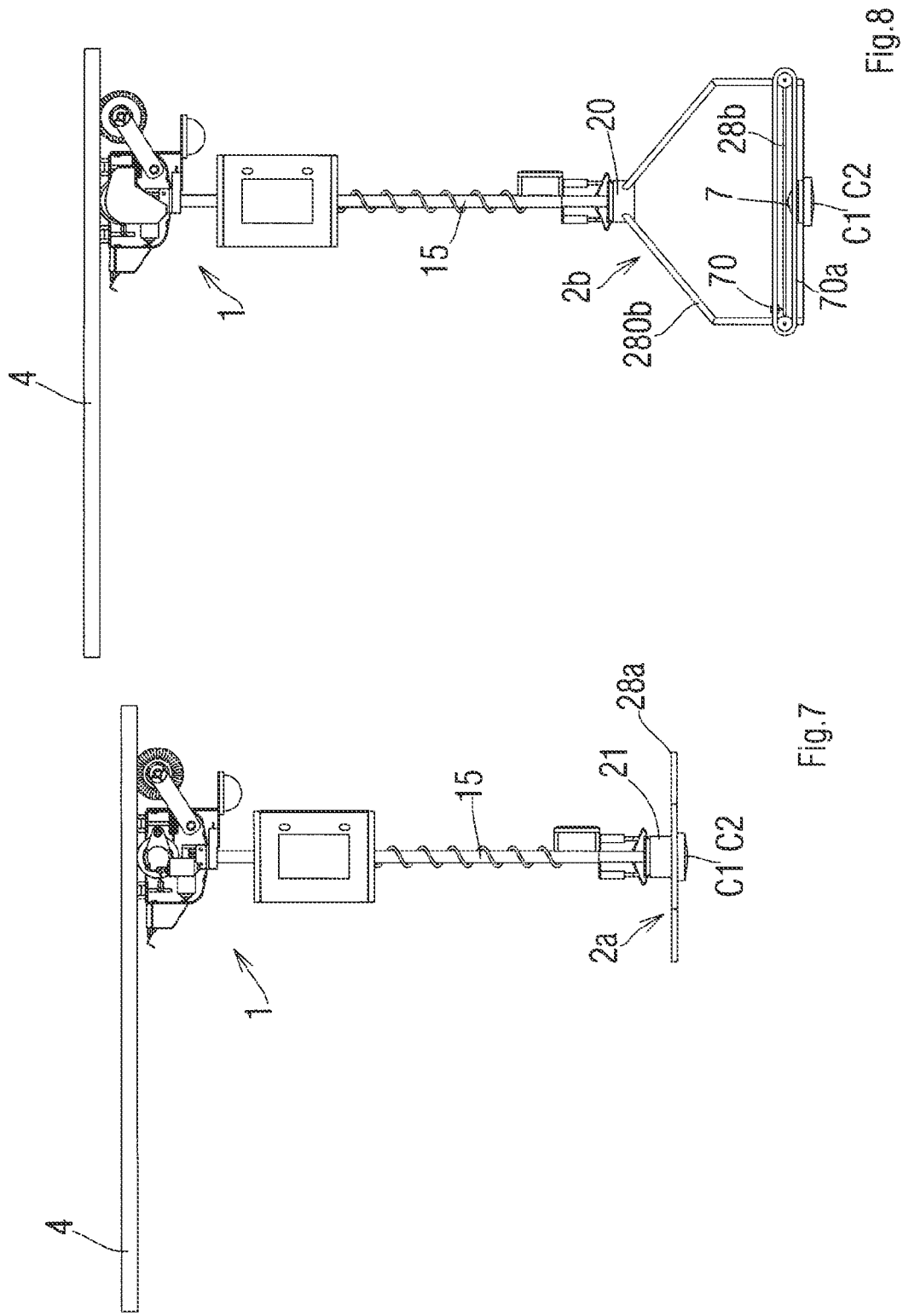

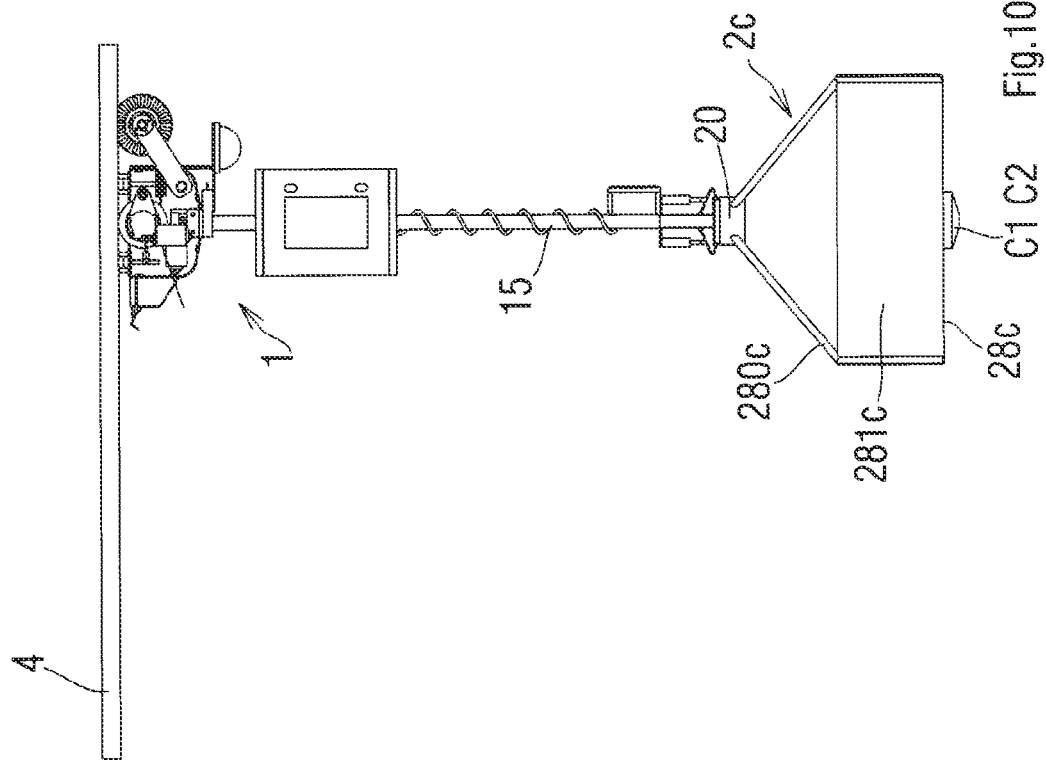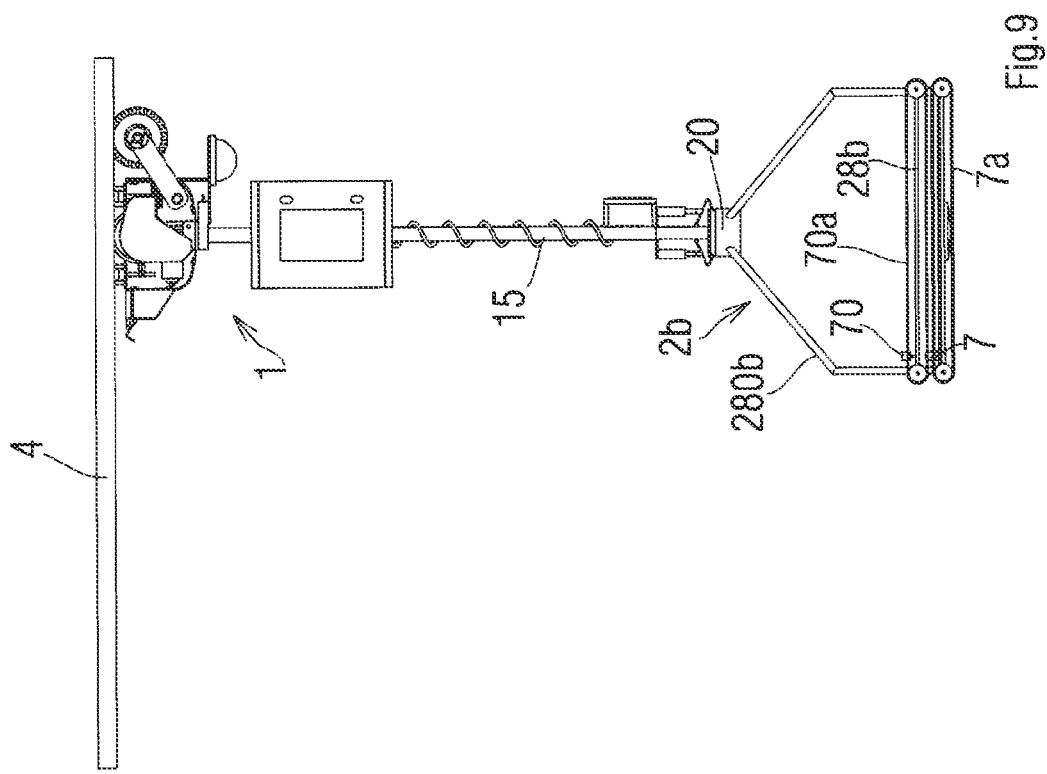

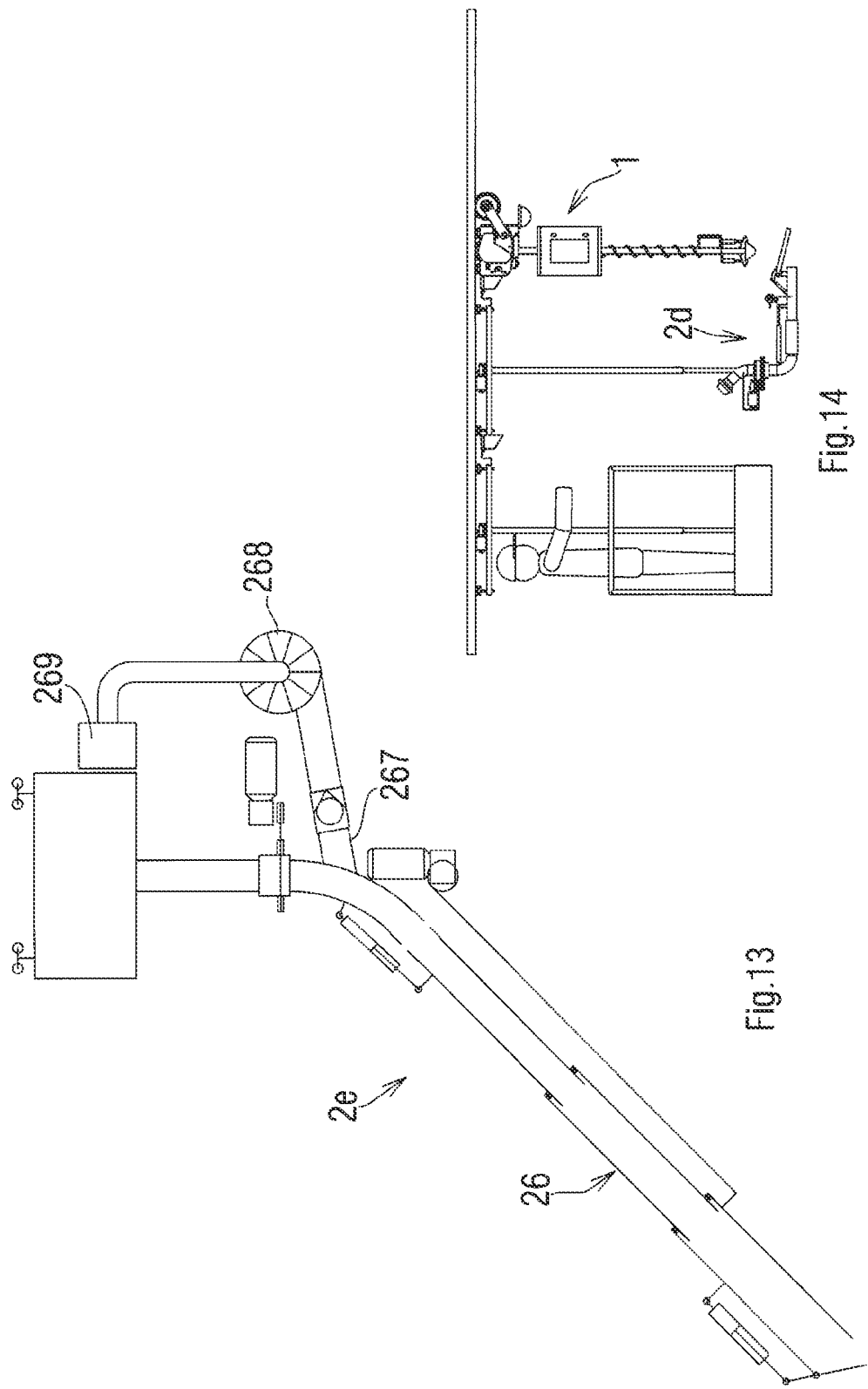

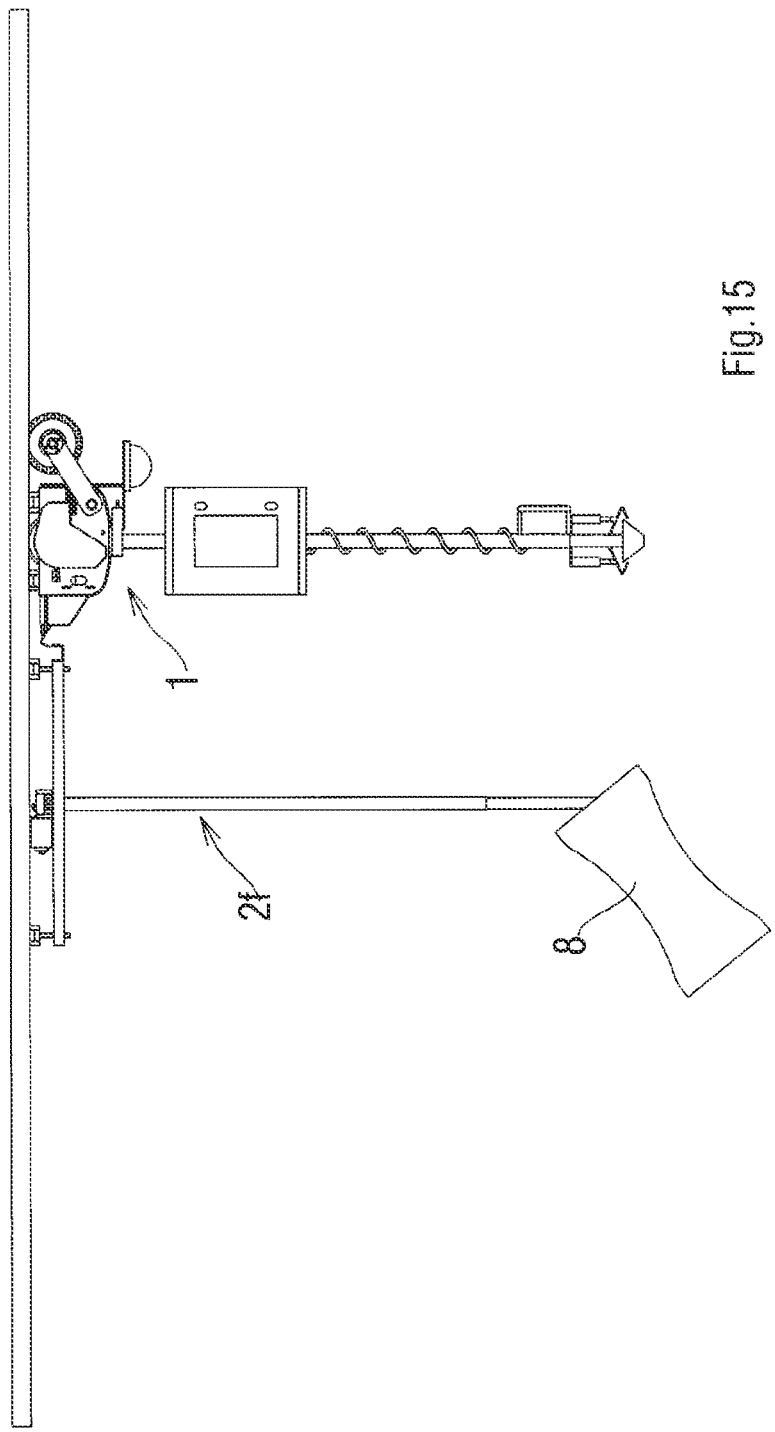

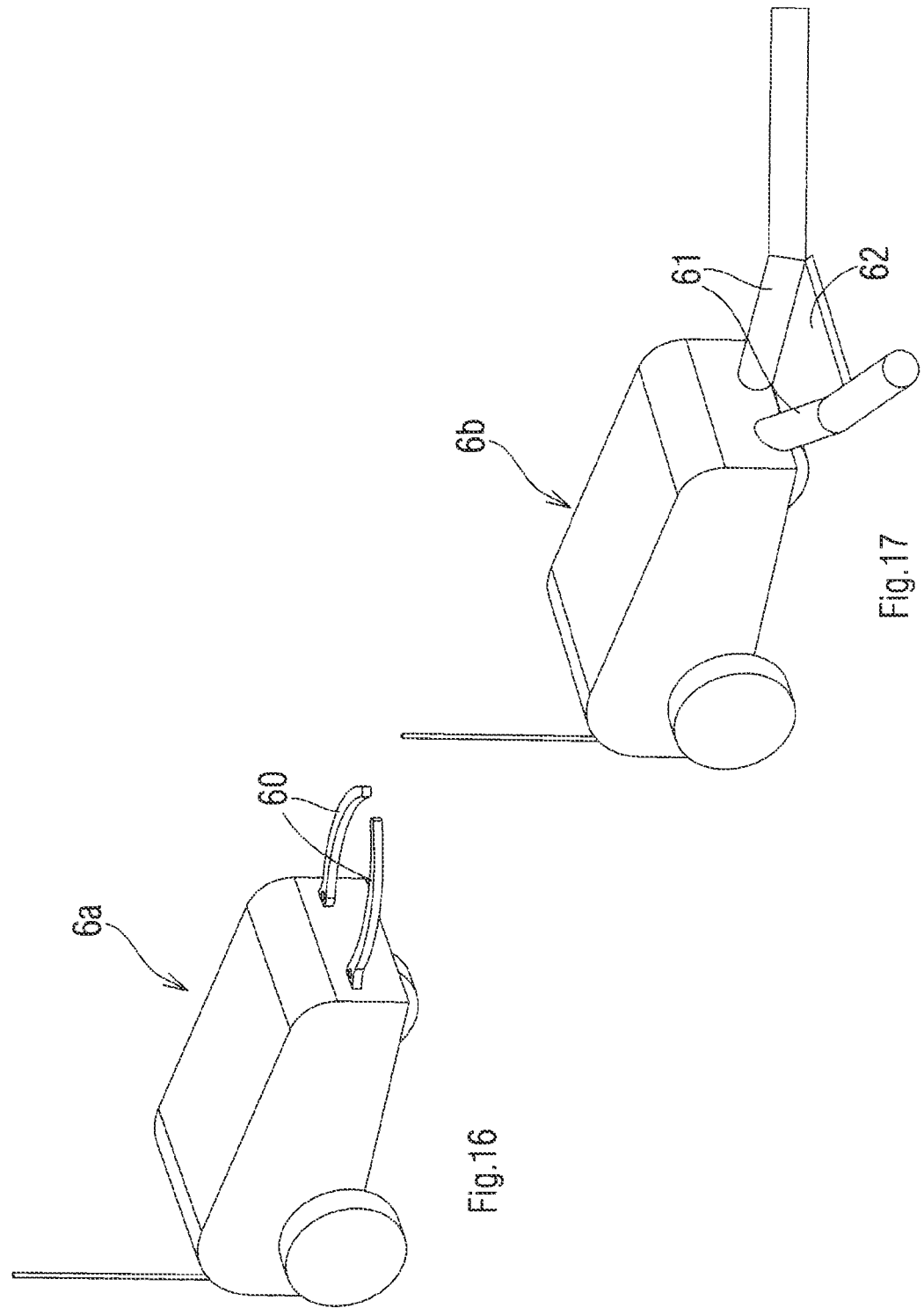

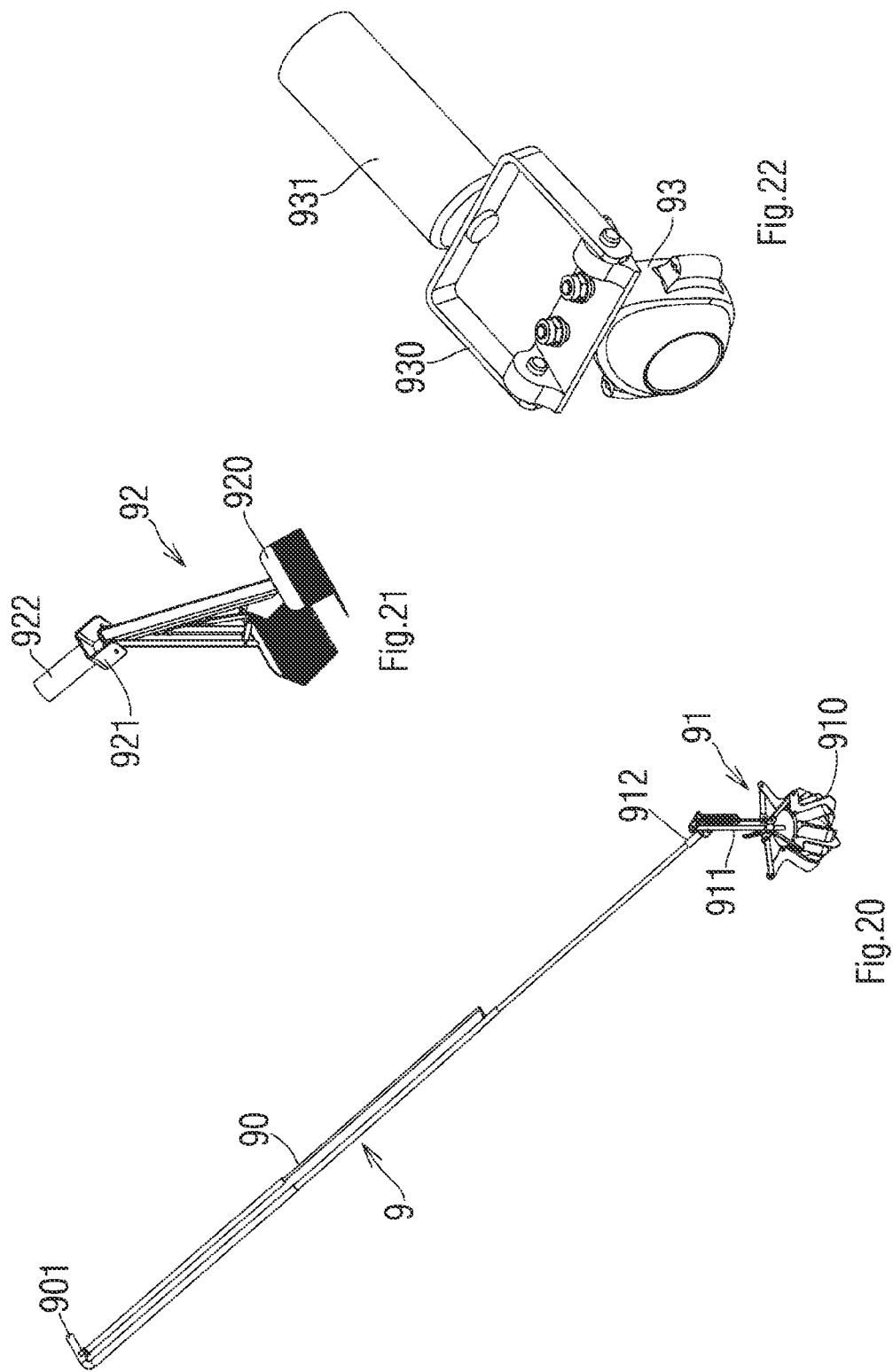

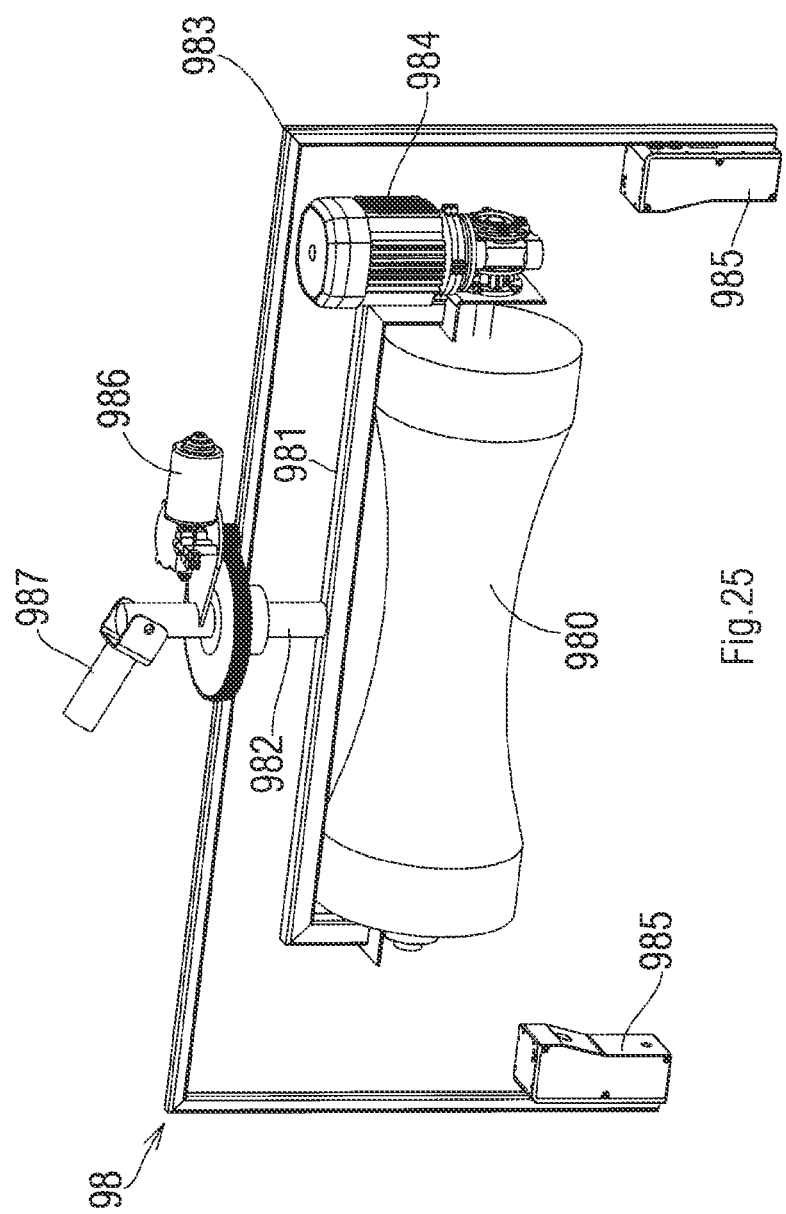

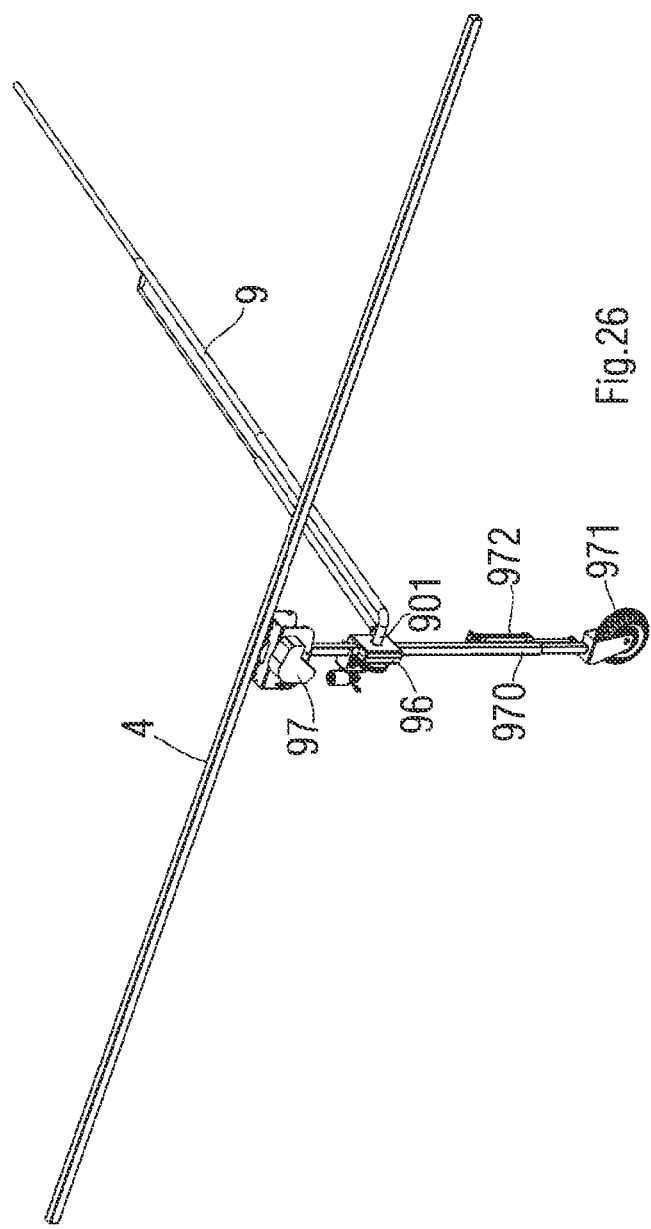

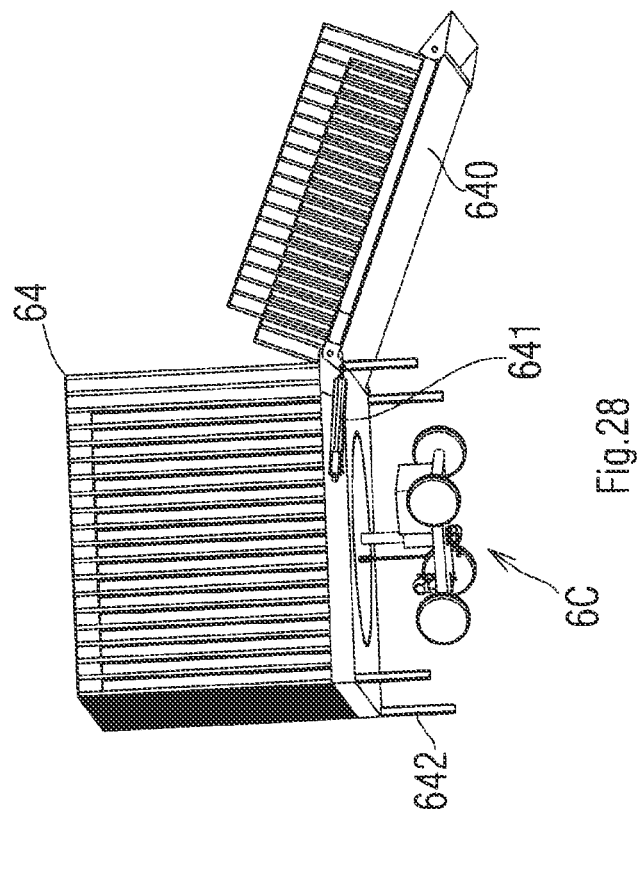
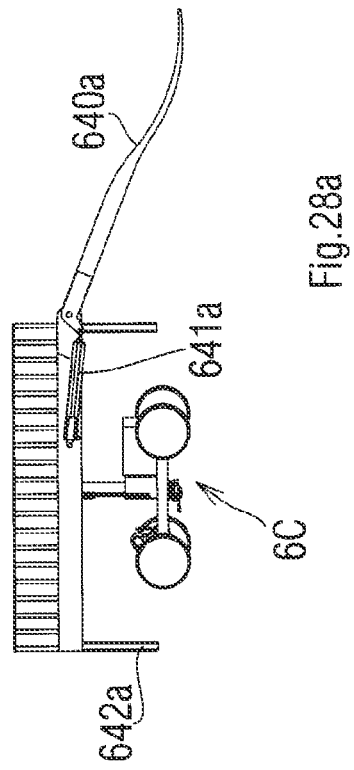
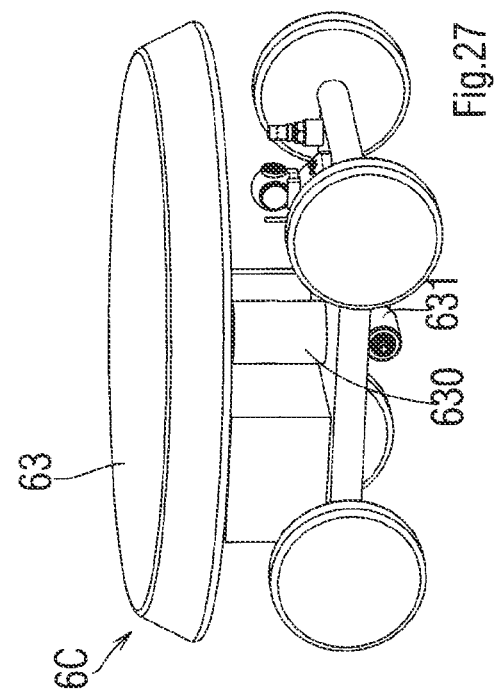

MONITORING AND INTERVENING ASSEMBLY FOR REARING PREMISES

BACKGROUND OF THE INVENTION

This application is the U.S. national phase of International Application No. PCT/IB2019/059759 filed Nov. 13, 2019 which designated the U.S. and claims priority to FR Patent Application No. 1871549 filed Nov. 13, 2018, the entire contents of each of which are hereby incorporated by reference.

Field of the Invention

The present invention relates in particular to the field of equipment and techniques used in the field of animal husbandry, in particular in order to monitor rearing premises and the animals resident therein.

Description of the Related Art

Because of the increase in the size of farms and the scarcity of personnel who can carry out the tasks of maintaining the premises, cleaning them, feeding the animals, litter distribution, etc, farmers opt for solutions aimed at more intense automation of these tasks with the aid of dedicated equipment. Thus, in the past, a variety of autonomous units have been used such as units for forming litter by litter distribution, feeding units, cleaning units etc. These various tried and tested units are now in routine use. However, completely equipping a farm with these various pieces of equipment implies substantial investment which is out of the reach of small and medium sized operations.

Some equipment, in particular in some units for distributing feed and for distributing litter distribution products, are installed with their reserves of product on rails suspended on the framework of the premises and, when full, are particularly heavy. For this reason, work often has to be carried out in order to reinforce the framework, which results in extra and particularly significant overcosts.

A particularly important operation is litter distribution because it increases the well-being of the livestock. An operation of this type has all too often been neglected in the past, which has resulted in a loss of yield due to the poor sanitary conditions of the litter. It has now been admitted that care applied to the formation of the litter and to maintaining it properly significantly increases yields by reducing the mortality and morbidity rates of the animal population and the number of sick animals, and as a result the quantity of remedial products administered to the animals, an example being antibiotics. The danger with an excessive use of antibiotics is known and recent studies have shown that the increase in the resistance of pathogenic bacteria to these substances will be responsible in years to come for a particularly high mortality rate among both animal populations and the human population because some agents will breach the species barrier. Thus, a reduction in the use of these remedial products is desired by farmers, both in order to reduce costs and to meet the demands of consumers.

In the majority of cases, litter can only be spread in the presence of animals because they cannot be removed from the rearing premises, either because of their age or because of the risk of infection from outside. In this situation, the litter distribution operation cannot be carried out autonomously with known equipment, but has to be controlled by the farmer in order to prevent litter products from being sprayed onto the animals, which could later lead to irritations and infections of the airways, eyes and auditory passages, both by dust generated during this operation and by bacteria which could be transported by this dust.

Freshly made litter must be regularly maintained for the sake of the comfort of the animals. This maintenance is normally carried out by adding litter products to the regions which are the most soiled and to the regions which are the wettest. Here again, this maintenance work, which consists of local spreading of litter products, often in the presence of the animals, cannot currently be carried out autonomously and in a discriminating manner using dedicated equipment and has to be supervised and controlled by the farmer. Such operations are particularly time-consuming, and for this reason, make-up litter distribution is either neglected or in fact carried out using litter distribution robots over the entire building or in certain predefined zones thereof, without the possibility of distinguishing between sanitised zones and soiled or wet zones. Thus, the sanitised zones needlessly become covered with litter products, generating financial losses. In contrast, soiled or wet zones might not be sufficiently covered. This situation gives rise to permanently wet zones which are often the cause of the appearance of pododermatitis.

Maintaining litter in a satisfactory, sanitised condition also consists of aeration operations using scarification apparatus. Apparatus of this type, handled by the farmer, is intended to stir the litter in order to aerate it and therefore in particular to reduce the risk of the release of ammonia. However, this stirring often leads to bringing to the surface pathogenic agents for various diseases such as pododermatitis, for example. For this reason, this aeration operation has to be accompanied by a litter sanitisation operation. However, this latter operation is not carried out very much due to lack of resources or lack of time, and so pathogenic agents can propagate throughout the premises. A scarification device is known which can move autonomously in the rearing premises over the ground among the animals and, along with stirring of the litter, can carry out sanitisation thereof by spraying a disinfectant. In order to be able to move in the rearing premises without risk to the animals, this apparatus is equipped with a camera and onboard electronic image analysis and artificial intelligence means the presence of which could make complete disinfection of the apparatus difficult. Furthermore, because of the environmental conditions in the rearing premises, equipment for guiding the apparatus has to be protected or even reinforced, which makes the apparatus even more expensive. Finally, this type of apparatus can only move at a very slow speed and also only during the day, so as not to disturb sleeping animals—being awoken unexpectedly is a known source of stress. Thus, these applications are limited and cannot be extended to permanent monitoring of the premises and the animals. In addition, because that apparatus is located on the ground, it is difficult to obtain an image of the entire premises and a close-up image of elements thereof.

A litter formation operation is systematically carried out after operations for complete cleaning and disinfection of the rearing premises. It could thus be imagined that this litter formation operation could degrade the hygienic conditions of the premises if the bedding has not been disinfected before spreading. The hygienic conditions of the building may also be degraded by the equipment used for the litter distribution operation. In fact, some pieces of equipment such as tractors are used outside the building and could introduce pathogenic agents into it when they enter.

With the aim of improving animal well-being, pig castration, beak trimming of poultry, declawing feet and other physical alterations to farm animals are currently being banned in a number of states. Such measures, along with the promiscuity of the animals, may have negative effects, however, because they are of a nature of keeping the animals in an elevated state of aggression towards their fellows. The only way of reducing the aggression of the animals is to distract them. It has been observed that adding litter has a recreational effect which can reduce their aggression. Similarly, the distribution of food onto a freshly renewed litter has the same effect. However, because of the insufficiency of means available to the farmers, this technique is rarely employed.

Thus, the equipment which is available in rearing premises is usually specific to a particular operation.

Thus, patent application EP 3 066 916 discloses a suspended dolly for animal stalls comprising a container forming a reservoir for litter product to be distributed and a distribution system for distributing the litter to a distribution location, the suspended dolly furthermore comprising a detection system which can detect the presence of an animal in the distribution location, and if a presence is detected, it can prohibit the distribution of litter.

In addition, patent application WO 2017/141155 discloses an inspection and monitoring system for zootechnical rearing activities. The system comprises transport means which can be displaced along a path adjacent to a poultry rearing space formed by batteries of cages and a series of sensors and a camera mounted on the transport means. In accordance with a first embodiment, the transport means is mounted on a chassis which can be moved above the battery of cages, that chassis carrying feed distribution hoppers. In accordance with a second embodiment, the transport means is formed by an automated apparatus which can move over the ground along the batteries.

The dolly and system pairs of the two documents cited above suffer from disadvantages linked to transport of the containers for the products to be distributed. Because of the weight it has to withstand, the support structures such as guide rails and possibly the hangers of these rails on the framework of the building must have relatively large sections in order to withstand the mechanical loads. Furthermore, the design of such dolly systems means that they cannot carry out any tasks other than the distribution of litter products or monitoring of the premises.

SUMMARY OF THE INVENTION

The present invention concerns the provision of a solution to the problems discussed above.

To this end, a monitoring and intervening assembly for rearing premises is provided, this assembly comprising:
- a movable monitoring unit provided with means for monitoring the rearing premises and the animals resident therein, the geographical coordinates of said unit in the premises being determinable with respect to an origin,
- at least one movable intervening module which is capable of being driven and controlled by said monitoring unit, said intervening module, when inoperative, being installed in a storage area,
- said monitoring unit and said intervening module both comprising cooperating mechanical coupling means for linking one to the other, which are lockable and unlockable, and
- said monitoring unit being capable of continuously monitoring the premises and the animals without, however, being coupled to the or one of the intervening modules.

It should be understood that the monitoring and intervening assembly is not specific to a particular task, but in contrast it can carry out a variety of tasks, in particular those within the context of activities belonging to rearing.

In addition, it should be understood that each intervening module has no need to be equipped with either autonomous means or locomotive means, because the autonomy of energy and/or locomotion is given to it by the monitoring unit. Such an arrangement drastically reduces the cost of each module and the overall investment. Thus, equipment provided with all of the modules necessary for good management of a farm now becomes accessible to any size of enterprise, even those which are the most modest.

Furthermore, these arrangements result in considerable lightening of the monitoring unit, the mass thereof being below 50 kg. A consequence of this lightening is a lower energy consumption. Another consequence of this lighter mass is that the monitoring unit is easier to displace. Another consequence of this lighter mass is the possibility of more rapid displacement of the monitoring unit.

In accordance with another feature of the invention, the monitoring unit comprises a means for driving it along a route.

An arrangement of this type provides the monitoring unit with an automotive nature, the energy source which is required for the drive means possibly being on-board or located remotely.

An on-board energy source may be constituted by one or more batteries. A remote energy source may be connected to the drive means via suitable linkages, these linkages possibly being constituted by electrical conductors which are a source of electrical energy, or by fluid (oil or air) transport pipes acting as a pneumatic or hydraulic source of energy.

Alternatively, in accordance with another feature of the invention, the monitoring unit does not include a drive means and is provided so as to be towed over a route by a motorised dolly. This dolly and the monitoring unit will be fixed to each other in a detachable manner, for example using bolts, or in a non-detachable manner, or in fact by using rapid coupling means, for example of the lockable and unlockable type. These means may be locked and unlocked either manually or using a plurality of actuators which are operated and controlled remotely by the monitoring unit or by the control and processing unit.

In accordance with a variation, the monitoring unit is towed by a cable forming an endless belt stretched between a driven pulley and a drive pulley coupled to a motor means for driving in rotation.

In accordance with another feature of the invention, the monitoring assembly is equipped with a processing, operating, analysis and diagnostics unit in communication with the monitoring unit, said processing unit being capable of analysing the data and signals emitted by at least the monitoring means which comprises the monitoring unit, of analysing these signals, of making a diagnosis and, if appropriate, of operating and controlling the monitoring unit in order to manage an intervention. A processing unit of this type will, for example, be constituted by at least one microprocessor or the like provided with artificial intelligence software.

In accordance with an additional feature of the invention, the processing unit is carried by the monitoring unit, but alternatively, in accordance with another feature of the invention, said monitoring unit is installed in a remote station. In accordance with this feature, wireless or wired communication means, which are known per se, are installed between said monitoring unit and the processing unit. Similarly, this processing unit may be installed in part on the monitoring unit and with the other part in a remote station. With this dispersed configuration, a plurality of monitoring units installed in various rearing premises may be associated with one and the same processing unit or its dispersed part.

In accordance with another feature of the invention, the monitoring unit comprises at least one monitoring camera which is capable of providing images of the premises and the animals resident therein, the processing unit comprising image analysis means. These image analysis means will essentially be constituted by suitable artificial intelligence software provided in the processing unit.

In accordance with an additional feature, the monitoring unit of the monitoring assembly is equipped with a video monitoring camera of the thermal type and/or a "3D" camera and/or a terahertz camera and/or an infrared camera.

The importance of thermal cameras is their ability to produce images which highlight the various infrared emissions from bodies. Because of these monitoring arrangements, it becomes possible to monitor the premises, the equipment therein, the condition of the litter as well as the animals, and their temperature and behaviour in order to detect any anomalies that would justify an intervention or alert. Image analysis means of this type are essentially constituted by artificial intelligence software.

In accordance with another feature of the invention, the monitoring unit comprises at least one sensor for measuring the quantity of ammonia and/or a sensor for measuring the quantity of carbon dioxide and/or a sensor for measuring the quantity of oxygen and/or a sensor for measuring temperature and/or a sensor for measuring the moisture content and/or a flow meter and/or an anemometer and/or a black ball type sensor and/or a microphone and/or an infrasound sensor and/or a sensor for dust and other particles. The data delivered by these various sensors will be processed by the processing and control unit, optionally with the aid of artificial intelligence software with which the processing unit is equipped.

The anomalies which might be detected by the monitoring assembly by means of the monitoring means transported by the monitoring unit may be of any type. They may concern the equipment and the environment of the rearing premises, or in fact the flock as a whole, a group of individuals of that flock or in fact one of the individuals of that flock.

In accordance with an additional feature of the invention, these anomalies will be indicated to the farmer via communication means which are known per se, for example wireless means, comprising at least one transmitter carried by the monitoring unit and at least one remote receiver installed at the farmer's location or carried by him/her. Purely by way of indication, these communication means may be constituted by GSM (Global System For Mobile Communications) emitter and by the mobile telephone of the farmer. These communication means may be wired in order to reduce exposure of the animals to wireless electromagnetic waves.

After analysis of these anomalies by the processing unit, possibly with the aid of artificial intelligence software with which it is equipped, the monitoring and intervening assembly could autonomously initiate any interventions aimed at reducing or removing them. Thus, in accordance with another feature of the invention, after diagnosis of the anomaly, the operating and diagnostic processing unit orders the displacement of the monitoring unit towards a storage region of the corresponding processing module, orders coupling of said module to said unit, orders the displacement of said monitoring unit and of the module towards the intervention site and manages and controls the intervention.

The anomalies with equipment may, for example, be leaks of water due to breakage of a duct, abnormal heat patterns in which the temperature is abnormally low or, in contrast, abnormally high representing, for example, failure of heating equipment or in fact the start of a fire. Such temperature anomalies will be detected with the aid of the or each thermal camera provided in the monitoring unit, and/or by temperature sensors and artificial intelligence software provided in the processing unit. Other anomalies may be detected by the moisture sensors, the carbon dioxide sensors, the ammonia sensors and the like. In the case in which the processing and control unit is in communication and control relationship with the equipment of the rearing premises, after detection of a leak on the water supply valves it could actuate in order to shut off that supply. Similarly, in the case of excess moisture below the watering lines, the processing unit could act on the pressure of the water supply to these lines as well as on the means for adjusting their height with respect to the ground. In the event of an abnormal temperature in the premises, the processing and control unit could act on the ventilation elements of the premises and on the heating equipment. The start of a fire may be detected by the or each thermal camera, but also by the gas sensors equipping both the premises and the monitoring unit. Under these conditions, the monitoring unit will generate an alert for the emergency services, this alert possibly taking the form of a voice message indicating the location of the fire. This fire or this start of a fire will be fought by automotive firefighting means with which the rearing premises is equipped; typically, these automotive means are formed by water lines and by sprinklers plugged with ampoules which can break in the event of a large rise in temperature.

In order to support the firefighting means with which the rearing premises is equipped, in accordance with another feature of the invention, the monitoring assembly is provided with a firefighting means. In accordance with an additional feature of the invention, this firefighting means is constituted by an extinguishing means carried by the monitoring unit and operated by it. Alternatively, in accordance with another feature of the invention, a firefighting module is provided with comprises a lance, which may be telescopic, connected to a hose for supplying an extinguishing product, said hose being connected to a remote dedicated supply outside the rearing premises, said dedicated supply being provided with a reservoir of extinguishing products. The extinguishing product may be constituted by water, by foam or by a particulate incombustible material transported by a fluid under pressure. The particulate material may be constituted by sand, while the pressurized fluid may be air, or in fact a non-fuel gas. The compressed fluid could also be constituted by an incombustible liquid, for example water.

The lance of the firefighting module may be telescopic and cantilever-mounted via its proximal zone on a turret of the module in order to be capable of being orientated in azimuth and elevation. Thus, different points of the building can be reached by the lance from a single position of the module.

In accordance with an additional feature, the distal end of the lance comprises a shut-off valve which can be manoeuvred by a motor means carried by the distal section and provided so as to be operated by the processing unit and wherein a mechanical retraction means is attached to the two sections, distal and proximal, of the lance, operated and controlled by the processing unit, forcing retraction of the lance when it is activated.

This lance is deployed by shutting off the valve and introducing a fluid under pressure into the lance, the degree of deployment of the lance being controlled by the processing unit by action on the mechanical retraction means. Next, the valve may be opened by the action of the corresponding motor means in order to deliver the extinguishing fluid.

In accordance with another feature of the invention, the mechanical retraction means is formed by a traction cable fixed via its free end to the distal section of the lance and with a cable winder fixed to the proximal section, said cable winder comprising a winding drum onto which the cable is wound, a motor means coupled to the winding drum, and an encoder coupled to the drum or to the motor, this encoder possibly being of the incremental or analogue or other type. This encoder is capable of delivering information in the form of signals relative to the degree of winding or unwinding of the cable and, as a consequence, to the degree of deployment or retraction of the lance. Retraction of the lance may also be obtained by applying a vacuum to the internal volume.

The firefighting module as described may advantageously be used for other purposes, endowing it with a high degree of versatility. Thus, in accordance with an additional feature of the invention, the distal end of the lance will be equipped with a temperature sensor in order to measure the temperature of a particular point of the premises or of the litter, the signals delivered by this temperature sensor being delivered to the processing unit. This may also be used to measure the external body temperature of the animals by bringing the temperature sensor either into the proximity of or into contact with the skin of these animals. In a variation, the temperature sensor will be capable of measuring the temperature of each animal remotely. Similarly, non-invasive sensors for measuring physiological parameters of the animals may be installed at the free end of the lance.

In accordance with another feature of the invention, the distal end of the lance of this module or of a module of the same type may be equipped with a cleaning means, for example a cleaning nozzle. Thus, by analysing the images provided by at least one of video camera with which the monitoring unit is equipped, it will be possible to clean the soiled zones of the premises, and only those zones. This will also result in substantial savings in cleaning products. These cleaning products may be water or aqueous solutions with disinfectant. Similarly, they may be constituted by suitable disinfectant gases.

The end of the lance may be provided with a camera the signals from which will be processed by the processing unit. In this manner, the cleaning precision will be increased.

In accordance with yet another feature of the invention, the end of the lance may be equipped with at least one sensor for the quantity of ammonia and/or a sensor for the quantity of carbon dioxide and/or a sensor for the quantity of oxygen and/or a temperature sensor and/or a moisture sensor and/or a light meter and/or an anemometer and/or a black ball type sensor and/or a microphone and/or a sensor for dust.

Alternatively, in accordance with another feature of the invention, the proximal end of the lance is connected to a bypass valve carried by the monitoring unit and operated by the processing unit; one of the channels of the bypass valve is connected to the dedicated extinguishing product supply and the other channel is connected to a vacuum pump in communication with a gas analyser carried by the monitoring unit. By acting on the bypass valve, the internal volume of the lance will be connected to the vacuum pump and by opening the end valve and activating the air pump, air will be sucked into the lance for subsequent delivery to the analyser followed by analysis.

Behavioural anomalies in the animals may affect the entire flock or just a few animals, or in fact an individual, and will be detected by analysis, with the aid of artificial intelligence software, of the movements of the animal or animals concerned from images provided by the or each camera. A nervous state in a female could indicate she is on heat, and in a pregnant female this could indicate the onset of parturition. Animals gathering together may be indicative of too low a temperature, while the animals being distributed along the walls of the premises may be an indication of too high a temperature in the premises. Similarly, an erratic gait such as lameness may be an indication of injuries to the feet. Flocking together could be an indication of an intruder in the rearing premises, for example a predator. It could also be an indication of an intrusive human presence other than the farmer.

These different types of anomalies are well known to the farmer and will be recorded in a database belonging to the processing unit. A sick beast could readily be identified by the processing unit by means of identification tags with which the animal is provided or will be provided, but also by facial recognition or, more generally, body recognition. Regarding poultry, recognition will be made by collars worn by the animals. The animal may be identified by reading from images, produced by one of the cameras, of the identification codes written on the tags or by reading a RFID chip carried by one of the animal identification tags, which may be passive or active, using a RFID reader. Facial recognition of the animal and more generally or all of the animals may be carried out by the processing unit using artificial intelligence software from images produced by the or each video camera.

By analysing these images with the aid of artificial intelligence software, it will also be possible to estimate the body mass of each animal which has been identified and of monitoring how it fattens. Thus, too low a rate of fattening at the end of a predetermined period may be representative of a poor state of health or of a problem with feeding. Similarly, too high a rate of fattening would have to lead to reducing the feed.

By using the camera and analysis of the video images provided by that camera using artificial intelligence software, it is also possible to search for dead animals with a view to transporting them towards an evacuation means. Such a search function will be improved by using a thermal camera or other suitable camera. With the aim of transporting the dead animals, in accordance with an additional feature, the monitoring assembly is equipped with a ground module, which is automotive, capable of moving over the ground of the premises, said module being wirelessly remotely controlled by the monitoring unit, and said remote controlled module comprising grippers for picking up the dead animals. Such a unit could also be used to collect sick animals and transport them to a care unit.

Alternatively, said module is equipped with an endless belt for collecting dead or sick animals.

In accordance with another feature of the invention, one of the modules is provided for spreading litter distribution products and other products such as feed and is provided with a spreading means, for example a spreading jet, supplied via a pneumatic or mechanical circuit for transporting products via a remote dedicated supply provided for disposition outside the rearing premises, said jet being capable of being orientated both in azimuth and in elevation, the orientation of the jet being controlled by the processing unit from the signals delivered by the camera or cameras and analysed by suitable artificial intelligence software. With the aid of the thermal camera carried by the monitoring unit, the processing unit will be capable of detecting soiled zones or colder zones in the litter due, for example, to a high moisture content, these cold or wet or soiled zones being generally located, but not limited thereto, below the drinking troughs and at the level of access outside the premises such as doors and traps. It will also be possible, by means of the operation and control of the spreading jet, to re-cover these zones and only these zones with litter products or with products that can absorb moisture. This also leads to saving litter product.

It should be noted that the detection of soiled zones may be carried out using a video camera functioning in the visible spectrum.

In accordance with another feature of the invention, the spreading jet of the spreading module carries a thermal camera provided for coupling to a monitoring unit via cooperating electrical connection means carried by said spray module and by said monitoring unit, the optical axis of the optical camera being parallel to the axis of the jet. By this means, the moist zones will be covered with more precision.

In accordance with another feature of the invention, the discharge outlet of the spreading jet is provided with an articulated deflector which can be adjusted, associated with operating motor means controlled by the processing unit.

In accordance with another feature of the invention, the spreading jet is vertical.

In accordance with another feature of the invention, the spreading jet is in communication with a dust removal means. Thus, the quantity of dust which may be produced during litter formation can be significantly reduced. This also reduces the risk of infection by pathogenic agents transported by the dust and risks of irritation of the respiratory tracts of the animals.

In accordance with another feature of the invention, the dust removal means comprises a cyclone.

In accordance with another feature of the invention, the monitoring unit is suspended via rollers on at least one horizontal guide rail along which it can be displaced and comprises at least one drive wheel which is urged against the rail, actuated by a motor means carried by the frame of the monitoring unit, said monitoring unit additionally comprising a means for controlling its position along the rail with respect to a reference or origin.

The guide rail is installed above the ground and is carried by the framework of the roofing of the building or by elements carried thereby. Because of this arrangement, the monitoring unit moves above the ground and above the animals and any obstacles on the ground. Thus, the monitoring unit can be displaced from one point to the other on the rail at a high speed.

In accordance with another feature of the invention, the coupling means comprised in the monitoring unit is formed by a telescopic hollow pole actuated in deployment or in retraction by an internal screw and nut mechanism provided with a motor means for driving the screw, the lower section of the pole comprising, at the lower end, a centering cone and motorized coupling claws, and the or each said module comprises a vertical pole provided at its upper end with a male centering cone and which has a hollow coupling shape provided in order to receive the coupling claws. In accordance with this arrangement, the or each intervening module can rest on the ground or in a cradle carried by the ground in a predetermined location of the rearing premises.

In accordance with another feature of the invention, the monitoring unit comprises strain gauges installed between its housing and the vertical pole. This disposition combined with the use of an appropriate module means that an animal can be weighed. In accordance with an additional feature of the invention, this module will be provided with a rigid horizontal plate for weighing, carrying means for coupling to the telescopic pole of the monitoring unit at its centre. With a view to weighing, the animal to be weighed will be induced by various means and procedures to mount the plate. For this purpose, food or water may be distributed over the plate or objects which are entertaining to the animal may be distributed.

In accordance with another variation of the invention, the weighing module is constituted by a weighing plate provided with rigid hangers carrying the means for coupling to the pole of the monitoring unit. The animal to be weighed will be induced to enter the weighing basket.

In accordance with yet another embodiment, the weighing module is disposed in a compartmentalised cot and is provided for weighing dead animals and injured animals. This cot comprises a plate constituting its floor and rigid hangers carrying the coupling means as described above at their upper ends.

In accordance with another variation, the guide rail is extended, via a junction point, by a storage zone for the or each intervening module, said or each intervening module being suspended above the ground via rollers either at the storage zone or the guide rail, depending on its position, and the coupling means are constituted on the one hand by a swivel hook articulated on the monitoring unit and associated with a manoeuvring motor means carried by the monitoring unit and controlled by the processing unit, and on the other hand by a coupling ring carried by the intervening module and provided to receive the coupling hook by form fitting.

Advantageously, in accordance with another feature of the invention, the plate of each weighing module receives, and fixes to its lower face, at least one temperature sensor, at least one moisture sensor and at least one sensor for analysing the chemical composition of the gases, at least one sensor for measuring the thickness of the litter. It becomes possible by these means to measure, by contact, the temperature of the litter and its moisture content as well as the chemical composition of possible releases of gas. To this end, the pole of the monitoring unit will be deployed in order to bring these sensors into contact with the litter at a very small distance therefrom or at a depth within said litter.

Advantageously, concerning the rearing of laying hens, in accordance with an additional feature, the monitor and intervening assembly is equipped with a remote controlled ground module for collecting eggs laid on the ground. In accordance with a practical embodiment, this module comprises two pick-up arms forming a V in the forward zone and a platform for receiving eggs formed between the arms. Advantageously, in accordance with another feature of the invention, the forward portion of each arm is formed by a horizontal roller.

BRIEF DESCRIPTION OF THE DRAWINGS

Other advantages, aims and feature of the present invention will become apparent from the following description of a preferred embodiment, given by way of non-limiting example and made with reference to the accompanying drawings, in which:

FIG. 1 is a front view of an assembly in accordance with the invention,

FIG. 1a is a detailed view of FIG. 1,

FIG. 2 is a detailed sectional view of the monitoring unit,

FIG. 2a is a profile of the guide rail,

FIG. 3 is an enlarged view of a spreading jet,

FIG. 4 is a view of a second embodiment of an assembly in accordance with the invention, FIGS. 7 to 10 show weighing modules in accordance with various embodiments, FIGS. 12 and 13 shows a spreading module, FIG. 14 shows a personnel transport module, FIG. 15 shows a brushing module, FIG. 16 shows a remote controlled module for picking up dead animals, FIG. 17 shows an egg collecting module, FIG. 20 is a view of a telescopic pole with grab, FIG. 21 is a view of a tool for collecting eggs provided for being carried by the pole of FIG. 20, FIG. 22 is a view of a camera provided for being carried by the pole in accordance with FIG. 20, FIG. 25 is a view of a veterinary device with exploratory probes, provided to be carried by the pole in accordance with FIG. 20, FIG. 26 shows a pole in accordance with FIG. 8 coupled to a manoeuvring box carried by a drive device, FIG. 27 shows a remote controlled module in accordance with another embodiment, FIG. 28 shows a cage for collecting injured animals installed on a remote controlled module in accordance with FIG. 27, FIG. 28a shows a cage for collecting dead animals installed on a remote controlled module in accordance with FIG. 27.

DESCRIPTION OF THE PREFERRED EMBODIMENTS

Figure 6:
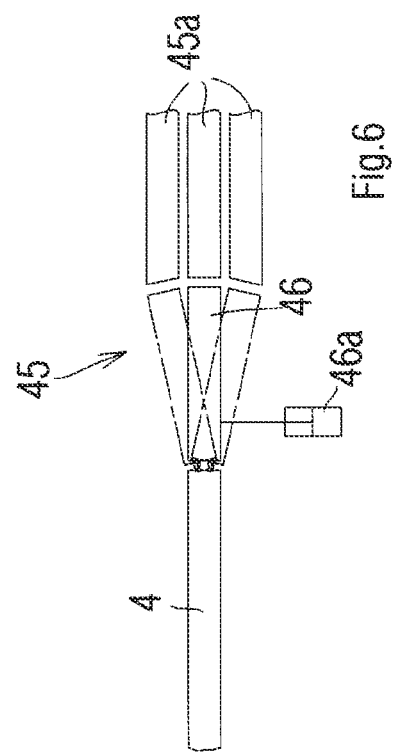
FIG. 6 is a diagrammatic view of a junction point.

FIG. 1 shows a monitoring and intervening assembly for rearing premises comprising:

a movable monitoring unit 1 equipped with means for monitoring the rearing premises and the animals resident therein, the geographical coordinates of said unit in the premises being determinable with respect to an origin, at least one intervening module 2a, 2b, 2c, 2d, 2e, 2f, 2g, 2h which is movable, which is capable of being driven and controlled by said monitoring unit 1, said intervening module, when inoperative, being installed in a storage area, said monitoring unit 1 and said intervening module both comprising cooperating mechanical means for coupling to each other which are lockable and unlockable and said monitoring unit 1 is capable of continuously monitoring the premises and the animals without, however, being coupled to the or one of the intervening modules.

The term "interacting lockable and unlockable mechanical means" should be understood to mean any means that are capable of establishing, by cooperation with each other, a mechanical connection provided to be non-permanent, said mechanical means being capable of cooperating with each other in a manner such as to be capable, on demand, of being assembled one with the other in order to establish a mechanical connection, and alternatively to be separated from each other in order to break the connection, which connection may be obturating, by adhesion, by means of a magnetic field or other means.

Additionally, the monitoring assembly in accordance with the invention comprises a processing unit 3, in communication with the monitoring unit 1, said processing unit 3 being capable of receiving data and signals emitted by at least the monitoring means comprised in the monitoring unit 1, of analysing these data and signals, of establishing a diagnosis and, if necessary, of operating and controlling the monitoring unit 1 in order to manage an intervention. This processing unit 3 is advantageously constituted by one or more micro-processors or equivalent and artificial intelligence software for analysing the data and signals, to undertake the diagnostics and to manage any interventions. The signals which the processing unit 3 may receive are of a video, audio or other type.

In the exemplary embodiment of FIGS. 1 to 4 in particular, the monitoring unit 1 is suspended from a guide rail 4 installed above the ground at a distance from the latter, horizontally or inclined, but in a variation, this monitoring unit 1 will be designed to be capable of being displaced over the ground of the rearing premises and will therefore comprise roller means, all or some of which will be motorised and all or some of which will be masters.

The monitoring unit 1 is preferably supplied with electrical energy by means of a set of on-board batteries, but it could receive this energy in part or in its entirety from a remote source of energy. In this case, the energy will be transported from this source to the unit 1 by means of electrical conductors which may be integrated into the guide rail 4 or formed by the latter, or in fact be formed by a multi-core electrical cable.

In the embodiment of FIG. 1, the guide rail 4 is formed by a tubular profile with a quadrangular cross section and comprises a longitudinal slot 40 disposed on its lower wall which, either side of the slot 40, forms two internal guiding tracks 41 of equal widths, which are preferably curved.

Clearly, the invention is not limited to this particular shape for this guide rail 4, and so this rail could have a circular or oval cross section, or in fact be constituted by any type of solid or hollow profile, for example IPN type profiles. Similarly, the monitoring unit 1 may be carried by two parallel rails in order to increase its mechanical stability.

The monitoring unit 1 comprises a metal chassis 10 forming a dolly which is substantially parallelepipedal in shape, comprising an upper wall, a lower wall, two vertical lateral walls parallel to the direction of movement of said unit and two transverse walls vertically over that direction. Preferably, at least one of the two lateral walls is removable for access to the internal volume of the dolly. Means 11 for guiding along the guide rail 4 are attached to this dolly 10. Advantageously, these means are formed by roller means 110 in the form of rollers and disposed in trains, carried by vertical supports 111 fixed to the upper wall of the chassis 10 of said processing unit 1. The trains of roller means are engaged in the guide rail 4 and the roller means 110 bear on the guide tracks 41 of which the guide rail 4 is composed. The supports 111 for this trains of roller means are engaged in the slot 40 and extend transversely thereof.

Advantageously, each vertical support 111 is extended downwardly by a threaded rod engaged in a through aperture formed in the upper wall of the dolly 10. In the dolly 10, this threaded rod receives at least one elastic means and a nut. The elastic means is threaded onto the threaded rod and is tightened between the nut and the lower face of the upper wall of the dolly.

The monitoring unit 1 comprises a means for driving along the guide rail 4. This drive means is formed by a drive wheel 12 coupled to a drive motor means 13 attached to the dolly 10. The wheel 12 is fixed to an axle engaged in two guide bearings respectively fixed to the two lateral walls of the dolly 10, said axle being coupled via one of its two ends to the rotary output shaft of the drive motor 13. This motor 13, which may be electrical in type, is fixed to the corresponding lateral wall of the dolly 10, on the outside thereof.

Most of the drive wheel 12 is inside the dolly 10 and is engaged via its upper portion through an opening formed in the upper wall of said dolly 10 in order to be able to be pressed, via its tread against the outer face of the lower wall of the guide rail 4. In order to accomplish this latter operation, the nuts of which the threaded rods of the supports 111 of the trains of roller means 110 are composed are manoeuvred in the tightening direction. It will thus be understood that by adjusting the degree of tightening of the nuts, the pressure level on the tread of the drive wheel 12 against the guide rail 4 is adjusted.

Each elastic means associated with each threaded rod is advantageously constituted by a disc spring, for example of the Belleville type. By deforming, these elastic means are intended to absorb any possible extra thickness which may exist in the lower face of the guide rail 4. These extra thicknesses may in particular be a result of the presence of joining elements between two sections of rail when said guide rail 4 is formed by several sections abutted one against the other. These extra thicknesses may also result from the presence of the brackets for suspending the guide rail 4 from the load bearing framework of the rearing premises.

Advantageously, the drive wheel 12 is formed by a central metal disk 120 inserted between two lateral flanges 121 wherein the peripheral edge of each of them, formed from a synthetic material, forms the tread of the drive wheel 12. The central disk 120 has a larger diameter than the diameter of the lateral flanges 121 and penetrates into the guide rail 4 by passing through the slot 40 of this rail 4. Thus, proper guiding of the monitoring unit 1 along its rail 4 is ensured.

The monitoring means comprised in the monitoring unit 1 is advantageously constituted by an image acquisition device 5. This device 5 is carried by a bracket fixed to the chassis 10 of the monitoring unit 1.

In accordance with a preferred embodiment, this device 5 is constituted by a video camera which can produce images in black and white or in colour, this camera possibly being associated with one or more optical filters. The image acquisition device 5 may also be constituted by a thermal type video camera. The monitoring unit 1 could comprise a plurality of image acquisition devices of different natures. Thus, it could comprise at least one camera which can provide video images in the visible region and at least one infrared camera, at least one thermal camera which can provide images in the near infrared spectrum and a terahertz camera which can provide images in the far infrared spectrum. Clearly, the invention is not limited to the presence of this type of image acquisition device and any type of device may be used. Thus, by this means, it is possible to detect the presence of wet zones, hot zones, cold zones, hotspots, etc. in the premises. In response to the detection of wet zones, a drying product or fresh litter may be poured onto the zone concerned.

The monitoring unit 1 could also comprise at least one 3D video camera. The video signals from these image acquisition devices will be processed by the processing unit 3 and more particularly by suitable artificial intelligence software comprised in the processing unit. The or each 3D camera may be used for monitoring and checking fattening of each animal. The signals obtained from the or each 3D camera will be analysed by the artificial intelligence software which is adapted to deduce the weight of the animal and compare that weight value with a preceding value or with a reference value. The identity of the animal the weight of which is being monitored may be determined by reading the tags it has been provided with, or in fact by facial or body recognition. The tags may be read by a camera if the identity has been written in a visible manner, or by a RFID reader in the case in which the identity of the animal has been written on a RFID chip housed in the tag.

The monitoring unit 1 is equipped with a monitoring means constituted by at least one sound acquisition device. This device may be constituted by a microphone. This microphone will be carried by the chassis 10 of the monitoring unit 1. These acoustic signals may be analysed by suitable artificial intelligence software in order to be interpreted. The monitoring unit could also be equipped with at least one device for the acquisition of infrasound and a device for the acquisition of ultrasound.

The monitoring unit 1 is also equipped with a monitoring means constituted by at least one sensor for the quantity of ammonia and/or a sensor for the quantity of carbon dioxide and/or a sensor for the quantity of oxygen and/or a temperature sensor and/or a moisture sensor and/or a flow meter and/or an anemometer and/or a black ball type sensor.

The monitoring unit 1 preferably comprises a means for indicating its position along the guide rail 4 with respect to a reference which is mechanically attached to this rail 4. In accordance with a preferred embodiment, this indicator means is formed by a follower wheel 14 urged against the guide rail 4, and by a means for measuring the angular displacement of the follower wheel 14.

The follower wheel 14 is preferably mounted on a swivel arm 140 articulated on the dolly 10 and urged against the guide rail 4 by an elastic means 141, for example a helical spring. The action of the spring 141 forces the arm 140 to pivot towards the guide rail 4 and ensures that the follower wheel 14 is held against the rail. The means for measuring the angular displacement may in particular comprise an incremental or analogue encoder coupled to the follower wheel 14. The signals emitted by this encoder will preferably be analysed by the processing unit 3 in order to calculate the position of the monitoring unit 1, and as a result the position of the or each intervening module coupled to said monitoring unit 1.

In accordance with another embodiment of the means for indicating the position of the monitoring unit, the follower wheel 14 comprises radial through openings which are regularly distributed, which alternate with radial solid portions, and the monitoring unit 1 carries at least one detector cell which is capable of detecting the radial openings and/or solid portions of the follower wheel.

In accordance with another embodiment, the means for indicating the position of the monitoring unit 1 is constituted by an incremental or analogue type encoder or the like coupled to the drive wheel 12. In this case, the monitoring unit 1 does not need to include a follower wheel.

It is also possible to simultaneously use the position indicating means associated with the drive wheel 12 and a position indicating means associated with a follower wheel 14.

These various means are capable of providing information relating to the position of said monitoring unit 1 along the rail with respect to a point of origin which is formed by a mechanical abutment, not shown, installed along the guide rail 4, and intended to be detected by a sensor, not shown, carried on the monitoring unit 1.

In accordance with a practical embodiment, the follower wheel 14 is formed by a central disk 142 inserted between two lateral flanges 143 each comprising an edge formed from a synthetic material forming a tread, the diameter of the central disk being larger than that of the lateral flanges. Under the effect of the action of the elastic means 141, the central disk 142 is caused to pass into the guide rail 4 by engaging through the slot 40 of the lower wall of the rail 4, and the peripheral edges of the lateral flanges 143 are pressed against the guide rail 4, and more precisely against the outer face of the lower wall thereof. Preferably, the radial through openings of the follower wheel 14 are formed in the central disk 142.

In accordance with another embodiment, the means for indicating the position of the monitoring unit 1 along the guide rail 4 is constituted on the one hand by a distance indicating system installed on the rail and carrying distance markers each indicating a distance from an origin, and on the other hand by a device for reading the markers carried by the indicator system.

In accordance with a practical embodiment, the distance indicator system is formed by a ruler carrying distance indications in the form of numbers or codes and the reading device is essentially formed by an optical reader, for example a camera, and optical recognition software for the distance indications.

As stated above, the monitoring unit 1 is provided with a means for coupling to an intervening module, and each intervening module is equipped with a complementary coupling means, these coupling means of the monitoring unit and of each module being provided in order to cooperate by coupling with each other and being of the lockable and unlockable type.

In accordance with a first embodiment, the coupling means comprised in the monitoring unit 1 is formed by an extensible pole 15 carried by the chassis 10 and actuated to deploy or retract by means of an actuating motor mechanism 16, this pole 15 comprising at the lower end, docking means for the intervening module provided in order to cooperate by docking with complementary docking means carried by the or each intervening module. In each case, the or each intervening module, when inoperative, is located in a dedicated zone of the premises and is disposed either on the ground or on a horizontal platform disposed on the ground, or in fact disposed in a dedicated cradle disposed on the ground.

In accordance with a practical embodiment, the pole 15 is hollow and telescopic and the motor mechanism for actuating deployment or retraction 16 is inside the pole. This pole 15 extends vertically downwards from the chassis 10 of the monitoring unit 1. This telescopic pole comprises at least two pole sections, upper 150 and lower, 151. As can be seen, the lower section 151 is slidably mounted in the upper section 150, while being blocked in rotation with respect thereto. Preferably, the two pole sections 150, 151 are formed by commercially available tubes with a square cross section.

In accordance with a preferred embodiment, the actuating mechanism 16 is inside the telescopic pole 15. Still in accordance with the preferred embodiment, the actuating mechanism 16 is constituted by:

a motor 160 fixed to the chassis 10 of the monitoring unit 1 and mounted in the latter, a screw 161 mounted in the two pole sections 150, 151 and extending axially inside them, said screw 161 being fixed via its upper portion to the output shaft of the motor 160 so that it can be driven in rotation by it, and a nut 162 in which the screw 161 is engaged by screwing, said nut 162 being fixed at the upper end of the lower section 151 of the pole.

Thus, because of these arrangements, the screw 161 is immobilised in translation while being able to be driven in rotation by the motor means. In this manner, the rotation of the screw in one direction or the other results in deployment of the pole 15 or its retraction.

In accordance with a first embodiment (FIG. 1a), the docking means of which the pole 15 of the monitoring unit 1 is composed are formed by a centering cone 152 and gripping claws 153 actuated by at least one motor means 154, while the docking means included in the or each intervening module are formed on the one hand by a centering cone 20 designed to be able to receive the centering cone 152 carried by the pole 15 of the monitoring unit 1 by form fitting, and on the other hand by at least one housing 21 provided to receive the gripping claws 153 by form fitting. The geometrical axis of revolution of each of the two centering cones 152 and 20 is vertical.

In accordance with one embodiment, the centering cone 152 of the docking means of the monitoring unit 1 is male in type, while the centering cone 20 of the docking means of the or each intervening module is female in type and is formed in a rigid cylindrical body 20a fixed to the structure of the intervening module. As can be seen in FIGS. 1 and 1, the centering cone 152 is fixed at the lower end of the lower section 151 of the pole in the axis thereof.

Preferably, the docking means carried by the pole 15 of the monitoring unit 1 comprises two opposed claws 153 each formed by a swivel arm and by a picking up finger 153a formed at the lower end of the swivel arm. The swivel arm of each claw 153 is articulated via its upper end to a clevis fixed to the lower section 151 of the pole and is manoeuvred between a disengaged position and a picking up position by a motor means 154 which is preferably constituted by a jack. Preferably, the housing 21 provided to receive the picking up fingers 153a is formed by a circular groove hollowed into the rigid cylindrical body 20a from the outer face thereof.

With a view to coupling to an intervening module, the monitoring unit 1 is displaced along the guide rail 4, above said intervening module so that the coupling means carried by its pole 15 is located vertically over the coupling means of the intervening module. The pole 15 is then deployed in a manner such that the centering cone 152 is engaged in the cone 20 of said intervening module. Next, the two gripping claws 153 are actuated by the jacks 154 so that the picking up fingers 153a penetrate into the groove 21. For transport of the intervening module, the pole is retracted.

Figure 5:
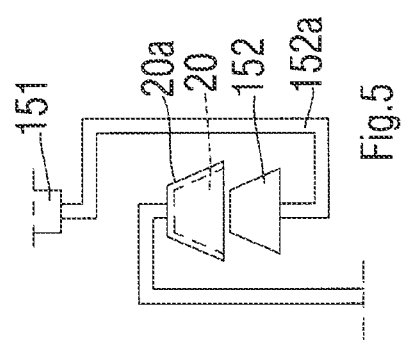
FIG. 5 is a diagrammatic view of the coupling means in accordance with a first embodiment.
Figure 12:
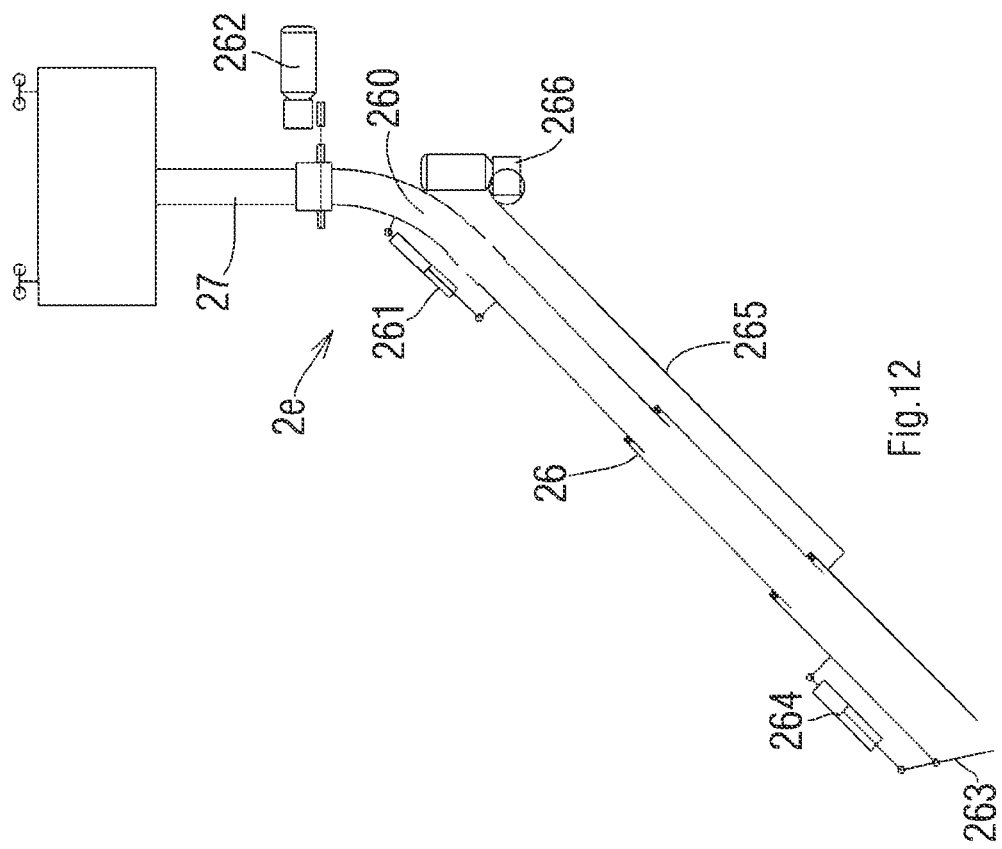

In accordance with another embodiment as can be seen in FIG. 5, the docking means of the extensible pole 15 are formed by a rigid support 152a fixed at the lower end of the lower pole section 151 and a vertical centering cone 152 carried by said support 152a at a distance from the lower end of the pole 15, said cone 152 and said pole being coaxial. The rigid support 152a, which is substantially in the form of a J, is provided with an upper branch via which is it fixed to the lower end of the lower section 151 of the pole 15 and by a vertical lower branch oriented towards the top and towards the pole 15, the centering cone 152 being fixed to that branch. The docking means comprised in each intervening module are formed by a support in the form of at least one rigid upwardly extending arm and a vertical centering cone 20 carried by the upper end of the support. The centering cone 20 is preferably located vertically over the centre of gravity of said intervening module and its shape is complementary to that of the cone 152 carried by the pole 15. Still in accordance with the preferred embodiment, the centering cone 152 carried by the pole is male in type and is fixed to its support via its large base. The centering cone 20 carried by the intervening module is female in type and is formed in a rigid body 20a carried by the support arm or arms, the concavity formed by this cone being orientated downwardly.

With a view to coupling to an intervening module, the monitoring unit 1 is displaced along the guide rail 4 until it arrives above said intervening module and its pole 15 is deployed so that that cone 152 occupies a position which is lower with respect to the cone 20a of the intervening module. Next, by displacement of the monitoring unit 1, the cone 152 is moved into the axis of the cone 20a. Finally, to carry out the coupling function, the pole 15 is retracted so that the male cone becomes engaged in the female cone. This arrangement for assembly using cones, in addition to a centering function, enables the intervening module to be immobilised with respect to the pole.

In accordance with another embodiment, the coupling means are constituted on the one hand by a swivel hook 155 articulated to the chassis 10 of the monitoring unit 1 and associated with a manoeuvring motor means 156 carried by the monitoring unit 1 and on the other hand by a coupling ring 22 carried by the module 2 and provided to receive the coupling hook 155 by form fitting. The motor means 156 is advantageously constituted by an electrical actuator of the jack type, for example. As described above, this embodiment is particularly suitable for an intervening module designed to be suspended on the guide rail 4. To this end, this intervening module will be provided with a dolly equipped with roller means and means for suspension on the guide rail 4.

Advantageously, the guide rail is associated with a storage zone 45 in which the or each intervening module is housed when inoperative. As can be seen in FIG. 6, this storage zone 45 is adjacent to the guide rail 4 (FIG. 6).

Advantageously, the storage zone 45 is in communication with the rail via a junction point 46. As can be seen in FIG. 6, the storage zone 45 is formed by fixed sections of rail 45a each provided to receive an intervening module. The junction point 46 is formed on the one hand by a section of rail articulated on the guide rail 4 and on the other hand by a motor means 46a controlled by the processing unit 3.

The section of rail forming the junction point 46 is in communication via one of its ends with the guide rail 4 and its other end is in communication with one of the sections of rail 45a of the storage zone 45. The motor means 46a which comprises the junction point 46 will preferably be constituted by an electric jack.

With a view to coupling one of the intervening modules, the articulated section of rail forming the junction point is brought into correspondence with the corresponding section of the storage zone unit by the motor means and the corresponding module is coupled to the monitoring unit 1 by manoeuvring the swivel hook 155.

Preferably, the monitoring unit 1 comprises both of the two coupling means as described above at the same time.

Advantageously, with a view to weighing animals, the monitoring unit 1 comprises strain gauges 17 installed between its chassis 10 and the vertical pole 15. To this end, the pole 10 is fixed via the upper end of the upper section of pole 150 to a horizontal platen 157 bearing against two strain gauges 17 installed either side of the pole 15, these strain gauges 17 being supported by a bracket of the chassis 10 of the monitoring unit 1. In accordance with this embodiment, coupling of the screw 161 to the motor 160 allows axial displacement of this screw 161 with respect to the output shaft of this motor 160. The signals emitted by the strain gauges 17 will be interpreted by the processing unit 3. This disposition allows animals to be weighed with the aid of suitable intervening modules 2a, 2b, 2c as described below. Modules of this type are shown in FIGS. 7 to 10.

FIG. 7 shows a weighing module 2a formed by a rigid horizontal plate 28a carrying coupling means 20, 20a, 21 at its centre as described above. This weighing module is principally intended for weighing poultry, but with the aid of any adaptation which is within the purview of the person skilled in the art, in particular concerning the plate, the monitoring unit 1, the guide rail 4 and the suspension elements therefor, it can be adapted to weighing animals with a much greater weight such as cattle, pigs, sheep or goats.

FIGS. 8 and 9 show a second embodiment of a module for weighing poultry. It can be seen in this figure that this intervening module 2b comprises a horizontal plate 28b carried by rigid hangers 280b, carrying means 20, 20a, 21, at the upper end as described above, for coupling the pole 15 of the monitoring unit.

FIG. 10 shows a third embodiment of a weighing module. This weighing module 2c is configured as a compartmented cot and is provided for weighing dead animals and injured animals. This cot comprises a rigid horizontal plate 28c, vertical walls 281c which are upright on the rigid plate 28c and rigid hangers 280c fixed to the rigid horizontal plate 28c and carrying coupling means 20, 20a, 21 as described above at the upper end. This weighing module 2c can also be used for evacuating these animals to dedicated locations.

Preferably (FIGS. 8 and 9), the plate 28b of the intervening module 2b which can be used for weighing animals permanently holds at least one temperature sensor C1 and at least one moisture sensor C2, an ammonia sensor, and a sensor which is not shown for analysing the chemical composition using NIRS (near-infrared spectroscopy), fixed on its lower face; the signals and data from them are analysed by the processing unit 3, a sensor for analysing the composition of the litter and a sensor for analysing the composition of faeces. By deploying the pole 15, it becomes possible to bring the sensors into contact or to a short distance from the ground or from the litter or faeces in order to measure it; as regards litter, this is in particular the temperature, moisture, the amount of ammonia which is released by the litter; regarding faeces, the composition is measured.

In accordance with an additional configuration of the invention, the weighing module 2b comprises a means for examining the state of health of animal feet, which is active during weighing, in order to detect during weighing any injuries and infections such as pododermatitis. In accordance with a practical embodiment, the plate 28b of the weighing module 2b is disposed in a sealed parallelepipedal box and the means for examining the state of health of the feet comprises an image acquisition device 7 housed in the sealed box. The sealed box comprises an upper horizontal wall provided in order to receive the animals to be weighed. This wall is formed from a material which is transparent to light, for example visible light. The optical axis of the image acquisition device 7 is orientated towards the wall which is transparent to light.

By analysing the images provided by the image acquisition device 7 or formed from the signals delivered thereby, the processing unit 3 and the suitable artificial intelligence software with which it is equipped will be capable of detecting any injuries to the feet, the hooves and the plantar zone as well as any infections such as pododermatitis, abscesses on the sternum and other changes.

In accordance with a first embodiment (FIG. 8), the image acquisition device 7 is constituted by at least one video camera, preferably of the wide angle type, which is permanently installed in the box in the central zone thereof.

In accordance with another embodiment (FIG. 9), the image acquisition device 7 is formed by a plurality of image sensors. These sensors are disposed in a line and are permanently mounted to equipment which is movably mounted on horizontal parallel runners mounted in the box below the upper transparent wall, said mobile equipment being displaceable in the box below said upper transparent wall by a motor means formed on the one hand by a motion transmission engaged with the mobile equipment and on the other hand by a motor means fixed in the box and engaging with the motion transmission. In accordance with a practical embodiment, this motion transmission is constituted by at least one endless belt 7a, preferably toothed, mounted on a drive pulley and a driven pulley, all being mounted in rotation on fixed axes of the box, the drive pulley being coupled to the motor means. This motor means is preferably operated and controlled by the processing unit 3.

In accordance with another embodiment, with a view to analysing the state of the animals' feet, the image acquisition device is constituted by at least one ultrasound probe.

With a view to cleaning the upper transparent wall (FIGS. 8 and 9), the box is equipped with a cleaning means which, for example, is constituted by a scraper means 70 which can move on said upper transparent wall of the box and bears against this upper wall. This scraper means 70 is driven along the upper transparent wall of the box by motor means which, for example, comprise two lateral endless belts 70a, which are under tension between driven and drive pulleys, the drive pulleys preferably being mounted on a common axis mounted on bearings which are fixed to the box, said axis being coupled to a motor means. The driven pulleys are mounted in rotation on axles fixed to the box.

Advantageously, the scraper means is associated with a plurality of nozzles (not shown) that can spray a cleaning liquid. These nozzles are orientated in a manner such that the cleaning liquid is sprayed onto the upper transparent wall of the box.

From FIGS. 1 and 4, a module 2d for spreading or distribution of products can be seen which is coupled to the monitoring unit 1. This spreading module 2d is either carried by the monitoring unit 1 and is coupled to the pole 15 (FIG. 1), or it is towed by the monitoring unit 1 and in this case is suspended on the guide rail 4 by rollers and coupled to the chassis of said monitoring unit 1 (FIG. 4).

In accordance with its two embodiments, this spreading module 2d comprises a spreading jet 23 which is horizontal or inclined to the horizontal, carried by a rigid supply pipe 24 formed by two pipe segments, upstream, 240, and downstream, 241, connected to each other via a swivel joint 242, said jet 23 being connected to the rigid downstream pipe segment via an elastically deformable sleeve 230. A first motor means 231 is installed between the jet 23 and the downstream segment 241 of the pipe by being kinematically coupled thereto and a second motor means 243 is respectively coupled to the two pipe segments 240, 241 and either side of the swivel joint 242.

The downstream pipe segment 241 forms an elbow, preferably at a right angle, and is vertically connected to the swivel joint 242. This swivel joint is formed by two portions which fit one into the other in a manner such as to be able to pivot with respect to each other about a vertical axis.

The upstream pipe segment 240 comprises a vertical support element which may be a post provided at its upper portion with coupling means 20, 20a, 21 to the pole 15 as described above.

In the case of a module suspended on the guide rail 4, this support element will be constituted by a vertical telescopic pole and a dolly suspended on the guide rail 4 by rollers. The telescopic pole is formed by an upper pole section and a lower pole section and is fixed via the upper portion of the upper section to the suspended dolly. The pole sections are slidably mounted one inside the other while being immobilised in rotation with respect to each other. As before, this telescopic pole will be actuated in retraction or in deployment by an actuating mechanism. This actuating mechanism will be constituted by a motor, preferably inside the dolly of the module, via a screw mounted in the two pole sections and extending axially therein, said screw being fixed via its upper portion to the output shaft of the motor so that it is driven in rotation thereby and by a nut in which the screw 161 is engaged by screwing, said nut being fixed to the upper end of the lower section of the pole.

The lower pole section is fixed via its lower end to the upstream pipe segment 240. It will be understood that the jet and the two pipe sections are by the post or by the telescopic pole, depending on the case.

The upstream pipe segment 240 is connected to a flexible aerial pipe for supplying products, this pipe being provided in order to be connected to a distant dedicated supply for delivering products installed outside the rearing premises, these products possibly being litter products or feed products. The products are transported from the dedicated supply to the spreading jet 23 pneumatically, i.e. these products are transported to the point of use by a current of carrier air. This technique has the advantage of the possibility of transporting products over relatively large distances, of the order of several hundred metres. It also has the advantage of avoiding using the rail to transport a reservoir of products using the intervening module, the products being heavy in themselves; the reservoir remains outside at a fixed station. Thus, the elements for supporting the guide rail 4 and the guide rail itself do not have any need to be reinforced. Preferably, the flexible supply pipe will be supported either by a dedicated rail or by the guide rail 4.

The two motor means 231 and 243 are operated and controlled by the processing unit 3. The aim of the motor means 231 is to adjust the inclination of the jet with respect to the horizontal, i.e. its elevation, and optionally to move the jet in an oscillating motion in a vertical plane. The motor means 243 is intended to adjust the azimuth of the jet, i.e. its angular position in a horizontal plane, and optionally to operate and control a rotational or oscillatory movement of the jet in a horizontal plane. Furthermore, the telescopic pole and its actuating mechanism with which the spreading module is associated can be used to adjust the height of the jet with respect to the ground.

Preferably, the motor means 231 is constituted by an electric jack the body of which is fixed to the downstream pipe segment 241 and its rod is fixed to the jet 23. The degree of deployment or retraction of this jack will be measured, for example by a potentiometer or by any suitable known means.

The electrical type motor means 243 is carried by a frame fixed to the upstream pipe segment 240 and has a rotary output shaft coupled to a motion transmission formed, for example, by a toothed pinion coupled to its output shaft and a toothed wheel coupled to the downstream pipe segment and engaged with the toothed pinion. The angular position of the jet 23 in a horizontal plane is controlled by an angular sensor the signals from which will be analysed by the processing unit 3. This angular sensor is coupled either to the output shaft of the motor means 243, or to one of the elements of the motion transmission.

This spreading and distribution module 2d can be used for operations for forming litter in rearing premises, but also for localised spreading of these products over wet or soiled zones identified as such by the processing unit 3 and the suitable artificial intelligence software from images delivered by the camera or cameras equipping the monitoring unit 1. It should be noted here that the soiled zones are identified from images delivered by a camera functioning in the visible spectrum, while the wet zones, which are generally colder, are identified from images delivered by a thermal camera. In order to refine covering of the wet zones, the spreading jet carries a thermal camera 244 orientated in a manner such that its optical axis is parallel to the longitudinal geometrical axis of the jet. The signals emitted by this thermal camera will be processed by the processing unit 3 and by the suitable artificial intelligence software.

By means of these various configurations, it will also be possible to spray and spread litter products in the presence of animals without, however, spraying these products onto these animals.

Advantageously, the jet 23 receives, at the level of its discharge outlet, an articulated deflector 255 with an inclination which faces the discharge outlet which can be adjusted by a motor means 256 constituted, for example, by an electric jack operated and controlled by the processing unit 3. This deflector is primarily aimed at orientating the jet leaving the jet largely downwardly.

Preferably, upstream of the jet 23 on the flexible product supply pipe, infrared type detectors are disposed which can detect burning bodies or high temperature bodies transported in said pipe. In the case of detection of such bodies, the deflector 255 will be manoeuvred in the direction of blocking off the mouth of the jet in order to prevent those bodies from reaching the litter. Still upstream of the jet, the flexible pipe could hold an acoustic detector which can detect sounds produced by the passage of foreign bodies. In the case of such detection, the deflector 255 will be manoeuvred downwards in order to send those bodies to a receptacle carried by the jet below its discharge outlet.

Figure 11:
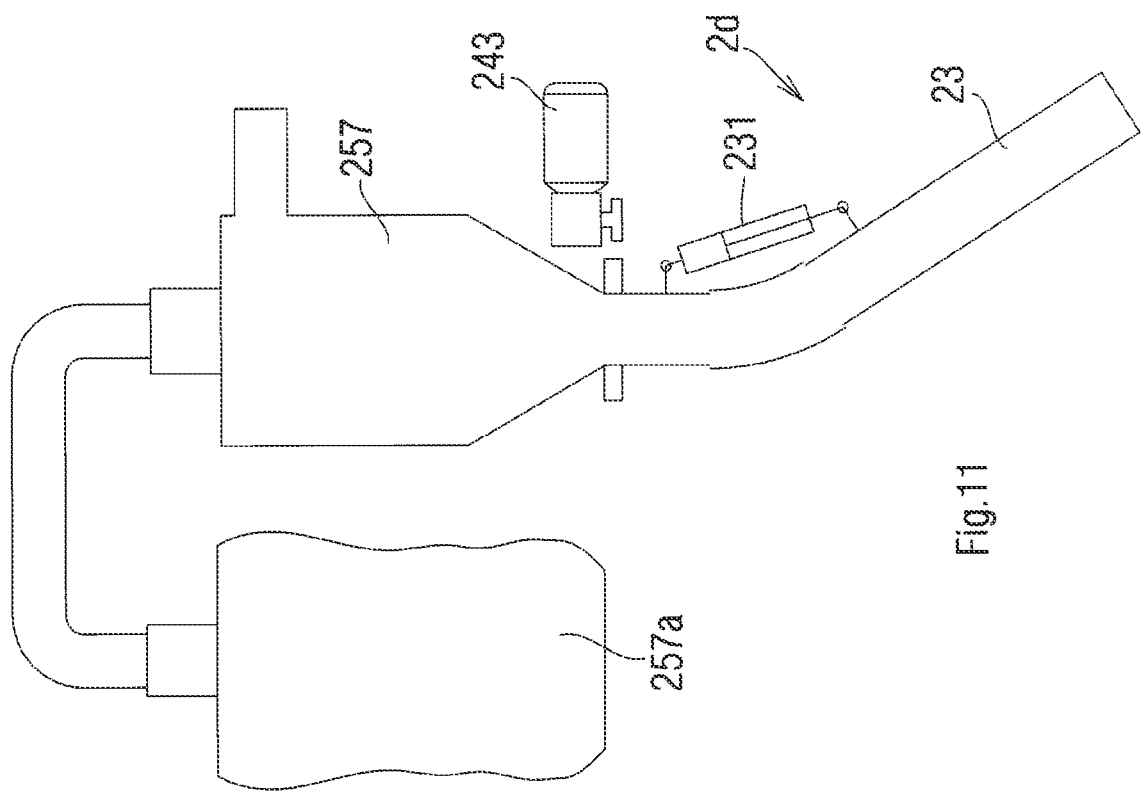
FIG. 11 shows a spreading jet associated with a dust removal means.

During spreading, some products can generate dust, and for this reason it is advantageous to remove dust from these products before spreading them or distributing them. For this reason, a dust removal means constituted, for example, by a cyclone 257 associated with a bag 257a for recovering dust is installed between the flexible supply pipe of the spreading and distribution module 2d and the upstream pipe segment 240 (FIG. 11).

As described, the spreading and distribution module 2d can be used to spread litter products in the rearing premises, but may also be used to spread any other type of product such as feed products. These feed products may be solid grainy products such as corn, liquid products such as milk, drinking water and soup, pasty products such as water-based food compositions and cereal flour, or powdered products such as cereal flour. They may be foraging products in the form of hay, granules and the like. The dry products may be distributed into the feeders, for example the feeding augers, or in fact be deposited onto the ground or onto the litter to enrich it and entertain the animals to improve their well-being and calm their aggression towards their fellows.

Figure 18:
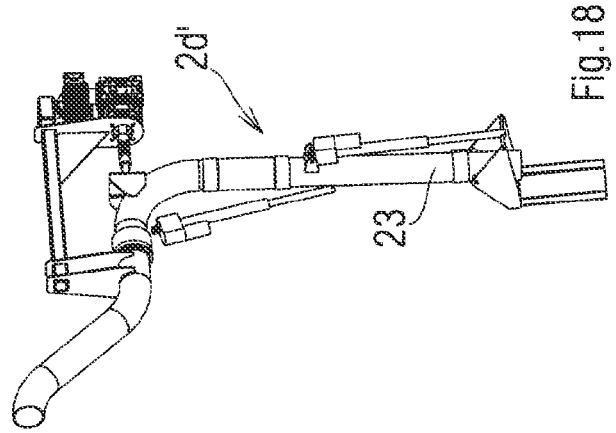
FIG. 18 shows a spreading and distribution module for supplying the feeders.

FIG. 18 shows a spreading and distribution module 2d' which is the same as module 2d with the exception that the oscillating jet 23 is orientated towards the ground and is in a vertical position when inoperative. In this configuration, the jet oscillates in a vertical plane. This other spatial disposition of the spreading module 2d is principally intended for filling the feeders. It will be noted in this figure that this spreading module 2d' is carried in a manner which is height-adjustable by means of a pole fixed to a dolly with rollers for suspension on the guide rail 4.

Advantageously, the monitoring assembly is equipped with an additional module 2e in particular for spreading, distribution and removal, comprising a dolly for suspension on the guide rail 4 to which is attached, via a rigid pipe 27, the upper end of a telescopic lance 26 provided to be in communication with a flexible hose supplying a product. The telescopic lance 26 is formed by a proximal pipe section, a distal pipe section and optionally one or more intermediate sections.

The flexible hose is connected to a remote dedicated supply which is outside the rearing premises, said dedicated supply being provided with a reservoir of products to be delivered.

The rigid pipe 27 is connected on the one hand to the flexible hose and on the other hand to the lance 26, and more particularly to the proximal section, via a flexible sleeve 260. This pipe is formed by two pipe segments, upstream 270, downstream 271, connected together via a swivel joint 272. The upstream pipe segment 270 is fixed to the dolly of module 2e and is connected to the product supply hose, while the flexible sleeve 260 is connected to the downstream pipe segment 271.

The telescopic lance 26 is provided with motor means for retraction and deployment. This lance can be orientated in azimuth and elevation by motor means 261, 262 controlled by the processing unit 3.

Thus, different points of the building can be reached by the lance 26 starting from the same position of the additional module 2e. This lance 26 is formed, for example, by a proximal lance section and a distal lance section, slidably mounted one in the other with interposed swivel joints.

The motor means 261 is intended to adjust the inclination of the lance 26 with respect to the horizontal and optionally to drive the lance in an angular oscillating movement with an adjustable amplitude, while the aim of the motor means 262 is to adjust the azimuth of the lance, i.e. its angular position in a horizontal plane, and optionally to drive the lance in a rotational or oscillatory movement in a horizontal plane. Advantageously, the motor means 261 is mechanically connected to the lance 26 and to the rigid downstream pipe segment 271 and is preferably formed by an electric jack. The motor means 262 is carried by the upstream pipe segment or by the dolly and is kinematically connected to the downstream pipe segment by a motion transmission formed by a toothed pinion fixed to the output shaft of the motor means 262 and by a toothed wheel engaged with the toothed pinion and coupled to the downstream pipe segment 271.

The angular position of the lance 26 in the horizontal plane is controlled by an angular sensor the signals from which are interpreted by the processing unit 3. This angular sensor is coupled to either the output shaft of the motor means 262 or to one of the elements of the motion transmission. The angular position of the lance 26 may also be controlled by time delays.

Alternatively, the angular positions of the lance 26 are controlled by a camera.

The distal end of the lance 26 comprises a shut-off valve 263 which can be manoeuvred by a motor means 264 carried by the distal section and provided to be operated by the processing unit 3. In addition, a mechanical retraction means controlled by the processing unit 3 is fixed to the distal and proximal sections of the lance, forcing retraction of the lance when it is activated or limiting deployment thereof.

By closing the valve 263 and introducing a fluid under pressure into the lance 26 it is deployed, the degree of deployment of the lance being controlled by the processing unit 3 by action on the mechanical retraction means. Next, the valve may be opened by action of the corresponding motor means in order to deliver the product.

Advantageously, the mechanical retraction means is formed by a traction cable 265 fixed via its free end to the distal section of the lance and by a cable winder 266 fixed to the proximal section, said cable winder 266 comprising a winding drum onto which the cable is wound, a motor means coupled to the winding drum, and an encoder coupled to the drum or to the motor, this encoder possibly being of the incremental or analogue type. This encoder can deliver information in the form of signals relating to the degree of unwinding or winding of the cable, and as a consequence to the degree of deployment or retraction of the lance 26.

Knowing the position of the module 2e along its support rail as well as the angular position of the lance 26 both in azimuth and in elevation as well as its degree of deployment or retraction, it becomes possible to determine with precision the position of the distal end of the lance in the premises, conversely, knowing the geographical position that the end of the lance 26 has to reach, it becomes possible to position the dolly of the module 2e in the best position and to position the lance both in azimuth, in elevation and in extension.

The module 2e with its lance 26 as described may be used for various tasks. It may be used both as a makeup means in firefighting and to this end, the lance 26 will be connected via the flexible pipe to a dedicated supply outside the premises provided with a reservoir of extinguishing product.

The extinguishing product may be constituted by water, by foam or by an incombustible particulate material transported by a fluid under pressure. The particulate material may be constituted by sand or a powder of a suitable material, while the fluid under pressure may be air or in fact a non-combustible gas. The fluid under pressure could also be constituted by a non-combustible liquid, for example water.

In order to aid in firefighting, the lance may be equipped with a thermal camera the signals from which are transmitted to the processing unit 3.

The module 2e and more particularly its lance 26 may be used to spread feed products such as cereals, pasty feed, soups and the like. In this case, the flexible supply hose of the lance 26 will be connected to a dedicated supply which is outside the premises for delivering these feed products.

The module 2e and more particularly its lance 26 may also be used as an accompanying or principal means for delivering litter products.

It may also be used as a means which can counter or cause an unwanted action in an animal. Regarding a laying hen, the module 2e may be used to discourage laying outside the nesting boxes. To this end, the lance may be used to direct a jet of compressed air onto the body of the laying hen.

The module 2e and more particularly its lance 26 may also be used as a means for removing samples of the atmosphere from the premises. To this end, the lance 26 will be connected to a bypass valve 267, controlled by the processing unit 3, in which one channel is connected to the product dedicated supply and wherein the other channel is connected to a vacuum pump 268 in communication with a gas analyser 269. By acting on the bypass valve, the internal volume of the lance will be connected to the vacuum pump 268, and by opening the shut-off valve 263 and actuating the pump, a sample of the atmosphere from the premises will be sucked into the lance to then be delivered to the analyser 269 and analysed. Advantageously, the analyser will be installed at a fixed station in the premises or in adjoining premises.

The free end of the lance 26 of the motor 2e may be equipped with various sensors that can deliver information relating to physical and/or chemical and/or biological parameters of the premises and its atmosphere and sensors that can deliver information relating to physiological data regarding the animals.

In a non-limiting manner, the set of sensors that can deliver information relating to physical and/or chemical parameters of the premises and its atmosphere could comprise at least one sensor for detecting the temperature of the atmosphere of the premises, at least one sensor for detecting the moisture content of the atmosphere of the premises, at least one sensor for detecting the carbon dioxide content of the atmosphere of the premises, at least one sensor for detecting the light intensity in the premises, at least one sensor for detecting the speed of the air in the premises. In addition, this lance 26 may be equipped, in a non-limiting manner, with at least one sensor for detecting the temperature of the litter and at least one sensor for detecting the moisture content of the litter, these acquisitions, depending on the nature of the sensors, possibly being made by direct or remote contact.

These various acquisitions will be made at different points of the premises and the litter. The data which is collected and the geographical coordinates of the points will be recorded. Thus, values for the parameters or values which are measured may be associated with each geographical point of the premises. By this means, it will be possible to produce one or more three-dimensional maps of the building, each associated with a representation in a suitable form of the various values for the measured value. As an example, concerning the temperature of the premises, this visualisation could take the form of graded colours from blue or red, the colour blue being associated with the lowest temperatures and red with the highest temperatures. Regarding airflows, the representation thereof may be in the form of vectors, each illustrating the direction, the sense and the intensity of said flow for the corresponding point. These various representations would enable the various disparities and anomalies to be corrected to be highlighted.

It should be noted that the low mass of the monitoring unit 1 and of the additional module 2e, and in particular of its lance 26, can enable rapid displacements in the premises as well as rapid measurements to be taken, so that a change in the premises of the measured value if that change is slow, would not have a significant influence on the results of these measurements.

The set of sensors that can deliver information relating to the identity and physiological parameters of the animals could optionally comprise at least one body temperature sensor, detecting this temperature possibly being carried out by direct contact or remotely. Concerning a duck, the temperature of the beak will provide an indication of fattening.

In a non-limiting manner, the set of sensors could also optionally comprise at least one sensor that could detect the identity of the animal, optionally at least one sensor that can detect the heartbeat of the animal and optionally at least one sensor that can detect panting in the animal, or its respiration. Thus, each animal will have various parameters relating to its state of health associated with it. It will therefore be possible to rapidly detect sick animals and to isolate them just as rapidly from the rest of the animals with a view to healing them. It will also be possible to rapidly detect dead animals and those with morbidity and to establish maps of the building which show up the positions of the sick animals, dead animals and morbid animals. Similarly, disparities in weight may be mapped.

It will also be possible, by means of the lance 26, to care for sick animals in situ. To this end, the lance 26 of the module 2e will be connected to a reservoir of remedial product. Similarly, the lance 26 may be equipped with a device that is adapted to caring. One of these devices will be constituted by a confinement bell provided to cover the sick animal, this bell being in communication with the lance in order to receive from it, for example, air charged with oxygen and/or any other treatment product.

Similarly, the module 2e may be used for disinfection of the rearing premises, and to this end would be connected to a reservoir of disinfectant product.

The module 2e with its lance 26 may be used to effectively combat tail biting in pigs, and against pecking in poultry. It would suffice for this to use the lance to separate aggressors from their victims. These attacks may be detected by the cameras and identified as such by the artificial intelligence software of the monitoring unit 1.

As a preventative measure, in order to anticipate these problems, the spreading lance may be used to distract the animals by adding different materials such as feed, cereals, long straw, gastroliths, in order to induce the animals to search for the food by scratching or grubbing.

The module 2e with its lance 26 may be used as a cleaning means, and to this end, the free end of the lance 26 will be equipped with a nozzle and/or a cleaning brush. The nozzle may be supplied with water via the lance. In this case in point, this lance may be associated with pipework for sucking up waste and cleaning products. This pipework and the lance may be coaxial and mounted one inside the other.

The gap between the pipework and the lance would be connected to a suction unit in order to evacuate waste and spent washing fluids.

The module 2e with its lance 26 may be used as a means for emptying the feeders by suction. In this case, the lance will be connected to a suction unit either directly or via an intermediate bypass valve.

The residual feed in the feeders may be identified from analysis using suitable artificial intelligence software of the images provided by the camera or cameras carried by the monitoring unit 1. After suction, the residual feed may be weighed. The weight of the feed residues may also be determined by analysis, with the aid of suitable artificial intelligence software, of the images provided by the or each 3D camera. In the case in which the feeder is associated with just one animal, the weight of the residues may provide an indication as to the state of health of the animal, knowing that a sick animal has a tendency to eat less.

The lance 26 may be used to actuate feeding grill arms.

FIG. 14 shows a module 2d for spreading and distribution fixed to a telescopic pole which in turn is fixed to a dolly suspended on the guide rail 4 as described above. This spreading module is coupled to a monitoring unit 1. It will be seen in this figure that a module 2h formed by a personnel transport cot is coupled to the suspended dolly. This cot is suspended on the guide rail 4 via the rollers. The means for retraction or deployment of the support pole of the spreading module 2d may be controlled by the person transported by the cot and to this end, the latter may be provided with a control box. The electrical energy supply may be delivered to this module by the monitoring unit 1, or in fact by on-board batteries.

In FIG. 15, a suspended module 2f is shown which can be used for massage and/or brushing of the animals, for example cattle. This module is formed by a dolly provided with roller means engaged in the rail 4 and an extensible pole, for example telescopic, provided with means for deploying and retraction formed, as described above, by a motor means carried by the dolly and a screw and nut mechanism actuated by the motor means. This module 2f, at the end of the pole, carries an orientatable frame carrying a rotary brush actuated in rotation by a motor means carried by the orientatable frame. The frame can be orientated in inclination between a horizontal position and a vertical position.

Figure 19:
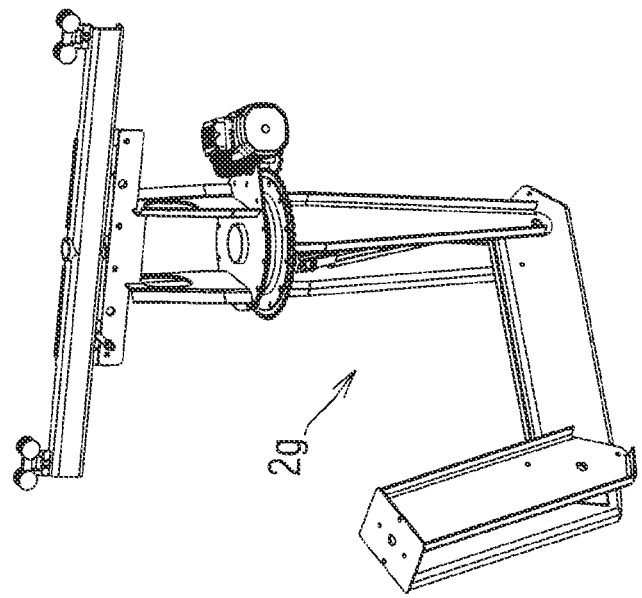
FIG. 19 shows a manoeuvring and manipulation module.

FIG. 19 shows a module 2g for manoeuvring and manipulation, formed by a robotic arm of the polar type carried by a dolly with rollers for suspension on the guide rail 4. A module of this type is provided in order to receive several tools. It may also be equipped with a hose for the distribution of products such as litter distribution products in particular or feed products such as those mentioned above. This arm could also be used for cleaning the monitoring unit 1 and the sensors and the camera carried by this unit and also for any other maintenance operation, for example cleaning the guide rail 4, the premises, etc. Thus, it could carry a washing lance supplied with cleaning product via a hose, or any other suitable equipment. It could also carry a firefighting lance.

As can be seen, in this figure, this manoeuvring module is provided with an orientation turret carried by the dolly to which the robotic arm is articulated, this latter being formed by several arm sections articulated on each other and motorised.

FIG. 20 shows a telescopic pole 9 provided to receive different detachable tools. The pole 9 is formed by two cylindrical tubes mounted slidably one in the other, associated with a motor means for deployment and retraction constituted, for example, by a jack 90. The body of the jack 90 is attached to one of the two tubes and its rod is attached to the other tube.

This figure shows that the lower end of the pole 9 is equipped with a detachable grab 91 for collecting dead animals and objects. This grab 91 is formed by a plurality of claws 910 articulated on a platen carried by a central post 911, opened and closed by an actuating mechanism formed by link rods each articulated on the one hand to a bushing slidably mounted on the central post and on the other hand to one of the claws, the bushing being drivable along the central post by a jack. The upper end of the central post 911 is articulated on a cylindrical sleeve 912 which is removably attached to the lower end of the pole 9 by form fitting.

FIG. 21 shows a tool 92 provided for collecting eggs, this tool being provided so as to be fitted onto the pole instead of the grab 91. As can be seen in this figure, this tool 92 is formed by two jaws 920 articulated on the same axis carried by a clevis 921 and opened and closed by a jack. The two jaws are formed with teeth that interpenetrate in the closed position. The clevis 921 is formed at the end of a sleeve 922 for removably fixing it to the lower end of the pole 9 by form fitting.

FIG. 22 shows a camera 93 with a support mounted on an orientatable frame 930 provided with a sleeve 931 for removably fixing it to the lower end of the pole by form fitting. The orientatable frame 930 is formed by a clevis carrying, between its two lateral limbs, two axially aligned journals to which the support for the camera 93 is articulated. Furthermore, the clevis for the frame 930, via its base limb, is articulated to the attachment sleeve 931 along the geometric axis of revolution thereof. The camera 93 may be used to check the eyes of the animals. The images obtained may be analysed by artificial intelligence software suitable for determining the state of health of the animals.

Figure 23:
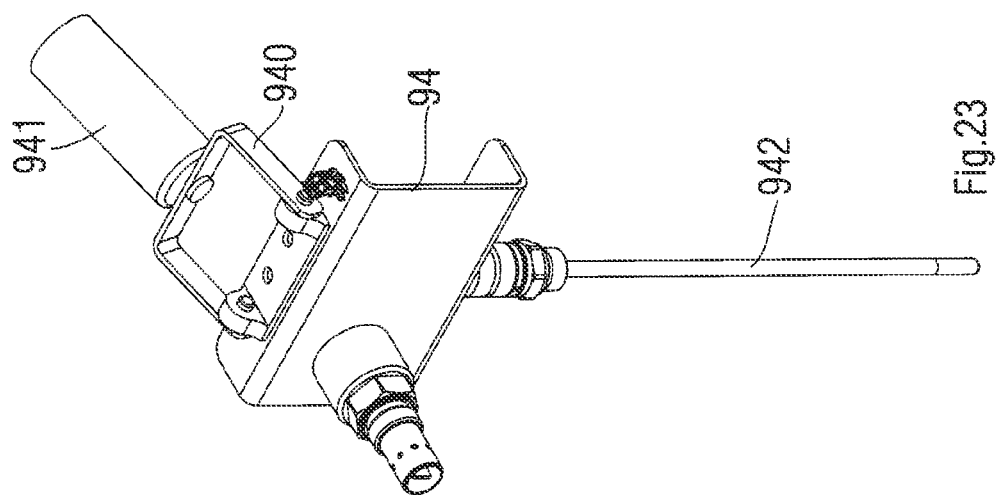
FIG. 23 is a view showing sensors with a common support provided to be carried by the pole in accordance with FIG. 20.

FIG. 23 shows sensors carried by a common support 94 attached to an orientatable frame 940 equipped with a sleeve 941 for form fitting attachment to the lower end of the pole 9.

As before, the orientatable frame 941 is formed by a clevis carrying two axially aligned journals between its two lateral limbs to which the common sensor-supporting support 94 is articulated. In addition, the base limb of the clevis is articulated to the fixing sleeve along the geometric axis of revolution thereof.

The support 94 carries a temperature sensor 942 which extends downwardly, provided in particular for acquisition of the temperature of the litter. This support 94 is also equipped with two other sensors, namely a moisture sensor and an environmental temperature sensor.

Figure 24:
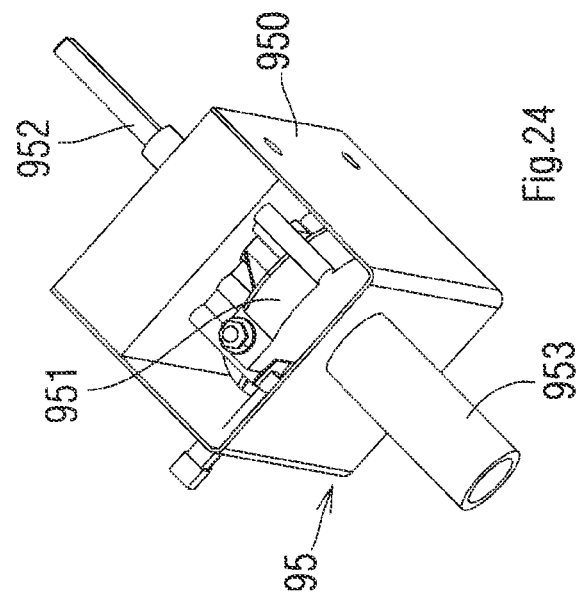
FIG. 24 shows a device for manoeuvring the rails of troughs, provided to be carried by the pole in accordance with FIG. 20.

FIG. 24 shows a device for manoeuvring the rails of troughs and other devices. This device is formed by a casing 950 in which are disposed a drive motor 951 and a manoeuvring finger 952, with a square cross section, mounted in rotation in a bearing formed in the casing 950, the manoeuvring finger being partially outside the casing so that it can be detachably coupled to the female rail manoeuvring element. The casing is equipped with a sleeve 953 for removable form fitting attachment to the lower end of the pole 9.

FIG. 25 shows a veterinary apparatus 98 for anatomical examination carrying non-invasive exploration devices 985 using signals from which one or more images of the interior of an animal's body may be formed and then analysed by artificial intelligence software adapted to investigating diseases. This apparatus comprises a horizontal motorised pressure roller 980 rotatably mounted between the vertical lateral limbs of a U-shaped gantry 981 the horizontal base limb of which is provided with a vertical shaft 982 at its centre extending towards the outside of the first gantry 981, a second gantry 983 being attached to the shaft via its base limb, the vertical lateral limbs of this second gantry 983 being positioned either side of the first gantry 981, said lateral limbs each carrying a non-invasive exploration device 985. The roller 980 is provided with two axial journals via which it is engaged in rotation in two bearings carried by the lateral branches of the first gantry 981. One of the two journals is coupled to a motor means 984, for example an electric reduction motor. For anatomical examination, the roller 980 is positioned on the back of the animal and by driving this roller in rotation, the apparatus is driven along the body of the animal. Preferably, the second gantry 983 is mounted in rotation on the vertical shaft 982 and can be driven in rotation by a motion transmission engaged with a motor means 986 fixed to the shaft 982. Advantageously, the motion transmission is formed by a toothed wheel fixed to the base limb of the second gantry 983 and a toothed pinion engaged with the toothed wheel and fixed to the output shaft of the motor means 986, this latter being constituted by a reduction motor.

These configurations mean that it is possible to drive the exploration devices around the animal.

A sleeve 987 for removable form fitting to the lower end of the pole 9 is articulated on the vertical shaft 982.

Each non-invasive exploration device may be constituted by an ultrasound probe, by a stethoscopic probe, by a temperature probe, by a heartbeat sensor and by any other known exploration device.

Advantageously, the telescopic pole 9 is provided with a shank 901 for fixing to a manoeuvring box 96 carried by a driving device 97 suspended on the guide rail 4 via rollers and provided with a drive wheel pressed against the inner face of the guide rail 4, this drive wheel being coupled to a motor of the drive device 97. As can be seen in FIG. 26, the fixing shank 901 is coupled to a hollow shaft coupled via a gear train to a motor means carried by the manoeuvring box 96. This figure also shows that the drive device 97 is provided with a vertical telescopic post 970 carrying a ground bearing wheel 971 at its lower end. The telescopic post is urged into an extension position by an elastic means 972, for example a gas spring, under the effect of the action of which the wheel 971 is firmly applied to the ground. Such an arrangement opposes swivelling of the assembly when the pole 9 occupies a lateral cantilever position.

A monitoring unit 1 may be fixed to the drive device 97.

Advantageously, the monitoring assembly is equipped with one or more automotive remote controlled modules 6a, 6b, 6c, which are controlled remotely, preferably wirelessly, by the processing unit 3 from information in particular provided by the or each camera provided in the monitoring unit 1. The or each remote controlled module 6a, 6b, 6c is provided to move over the ground of the rearing premises and comprises a chassis mounted on the ground bearing wheels and/or on tracks. At least one of these wheels or tracks is directing and is the master with a kinematic master provided with an electric motor supplied from electric batteries and remotely controlled wirelessly by the processing unit 3. The master wheel or at least one of the other wheels may be coupled to an electric motor supplied via batteries and controlled wirelessly, again by the processing unit 3.

One, 6a, of the remote controlled modules (FIG. 16) is advantageously provided with gripping claws 60 for collecting dead or injured animals. These gripping claws are actuated by an electric motor supplied via a battery and remotely controlled wirelessly by the processing unit 3. This remote controlled module 6a is intended to collect poultry. After picking up a dead or injured bird, this module 6a will be directed towards the weighing module 2d to be weighed and transported to a dedicated area.

FIG. 17 shows another remote controlled module 6b. This module 6b is intended for the collection of eggs. In accordance with a practical embodiment, this module 6b comprises two pick-up arms 61 forming a V in the front zone and a platform 62 for receiving eggs formed between the arms.

Advantageously, in accordance with another feature of the invention, the front portion of each arm is formed by a horizontal roller.

FIG. 27 shows a module 6c in accordance with another embodiment. This module 6c has a horizontal upper plate 63 with a circular contour and a tapered shape firmly attached to the rod of a screw jack, which is vertical, with its body engaged in rotation in a bearing fixed to the chassis of said module, said jack being coupled via a motion transmission to a motor means 631 for driving in rotation which is carried by the chassis. This module 6c is equipped with a video camera and a plurality of sensors, in particular a temperature probe.

The module as described is provided to receive various accessories and tools, these latter having a horizontal wall provided with a mounting indentation with a shape which is complementary to that of the plate 63 of the module 6c in order to receive said plate, said indentation facing downwards. The horizontal wall also comprises feet for bearing on the ground. In order to transport the accessory or the tool that is to be used, the plate of the module 6c is lowered and this module is engaged below the horizontal wall of said accessory or tool. Next, the plate is raised in order to penetrate on the one hand into the indentation and on the other hand to lift said tool or accessory.

FIG. 28 shows a module 6c carrying a cage 64 for collecting sick animals. It can be seen that this cage 64 has a lower horizontal wall provided with the mounting indentation, an articulated front wall 640 which can be dropped down towards the ground to facilitate loading of the animal. This front wall is provided with an access ramp to facilitate introduction of the animal. The wall 640 is manoeuvred between its closed position and its open position by a motor means 641 constituted by an electric jack, for example.

The cage is provided with feet 642 which bear on the ground.

FIG. 28a shows a cage 64a for collecting dead animals installed on a module 6c as described above. This cage differs from the cage 64 in the shape of the front wall 640a, this latter being configured as a collecting bucket. This cage has a horizontal lower wall provided with a mounting indentation and feet 642a and a motor means 641a for manoeuvring the front wall 640a, this motor means being constituted by an electric jack.

Figure 29:
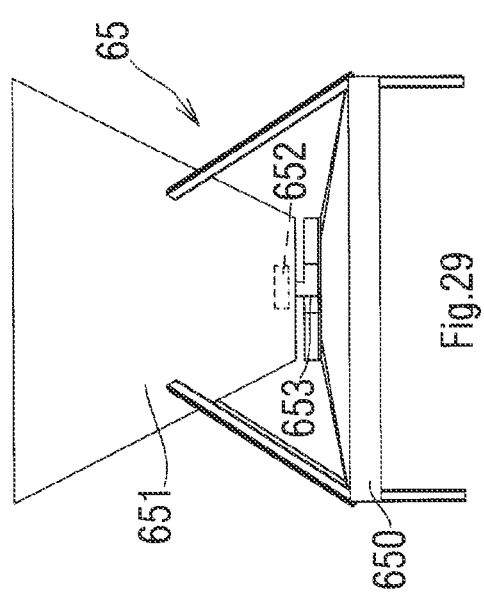
FIG. 29 represents a section of a litter distributor provided to be carried on a remote controlled module in accordance with FIG. 27.

FIG. 29 shows a litter distributor 65 provided to be carried by the module 6c described above. This litter distributor comprises a horizontal lower wall 650 supported on feet, provided with the mounting indentation, a hopper 651 which is conical in shape provided to receive the litter to be distributed, this hopper 651 being supported above and at a distance from the lower wall 650 by support legs. A motor 652 for driving a paddle spray rotor 653 in rotation is permanently mounted in the hopper; it operates between the bottom of the hopper and the horizontal lower wall 650.

Figure 30:
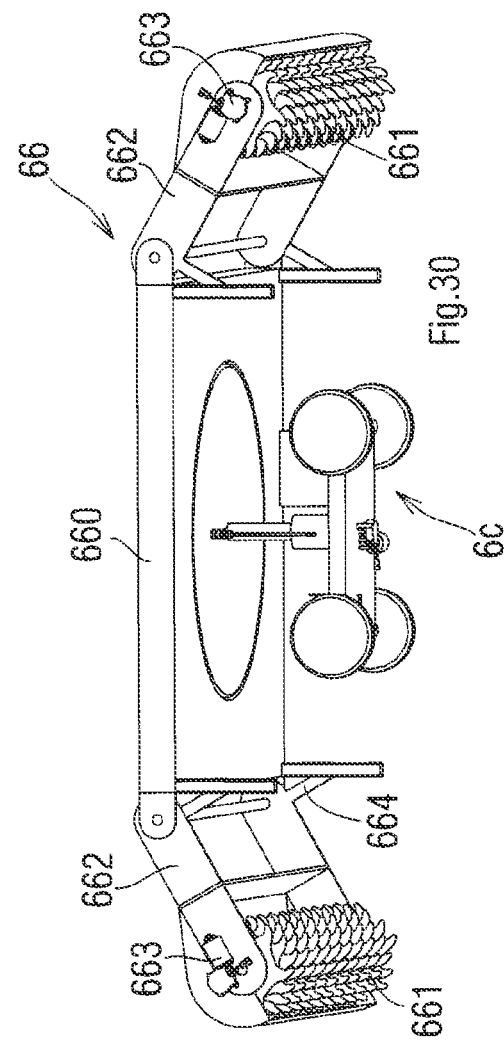
FIG. 30 shows a scarification device provided to be carried on a remote controlled module in accordance with FIG. 27.

FIG. 30 shows a scarification device 66 provided for aeration of the litter. This device 66 comprises a horizontal wall 660 supported on feet, provided with a mounting indentation and at least one scarification roller 661 carried by two arms 662 articulated on the wall 660, the scarification roller being driven in rotation by a motor means 663. In order to limit swivelling of the scarification roller 661 downwards, each support arm 662 is provided with a stand forming an abutment provided to bear against the corresponding foot.

Figure 31:
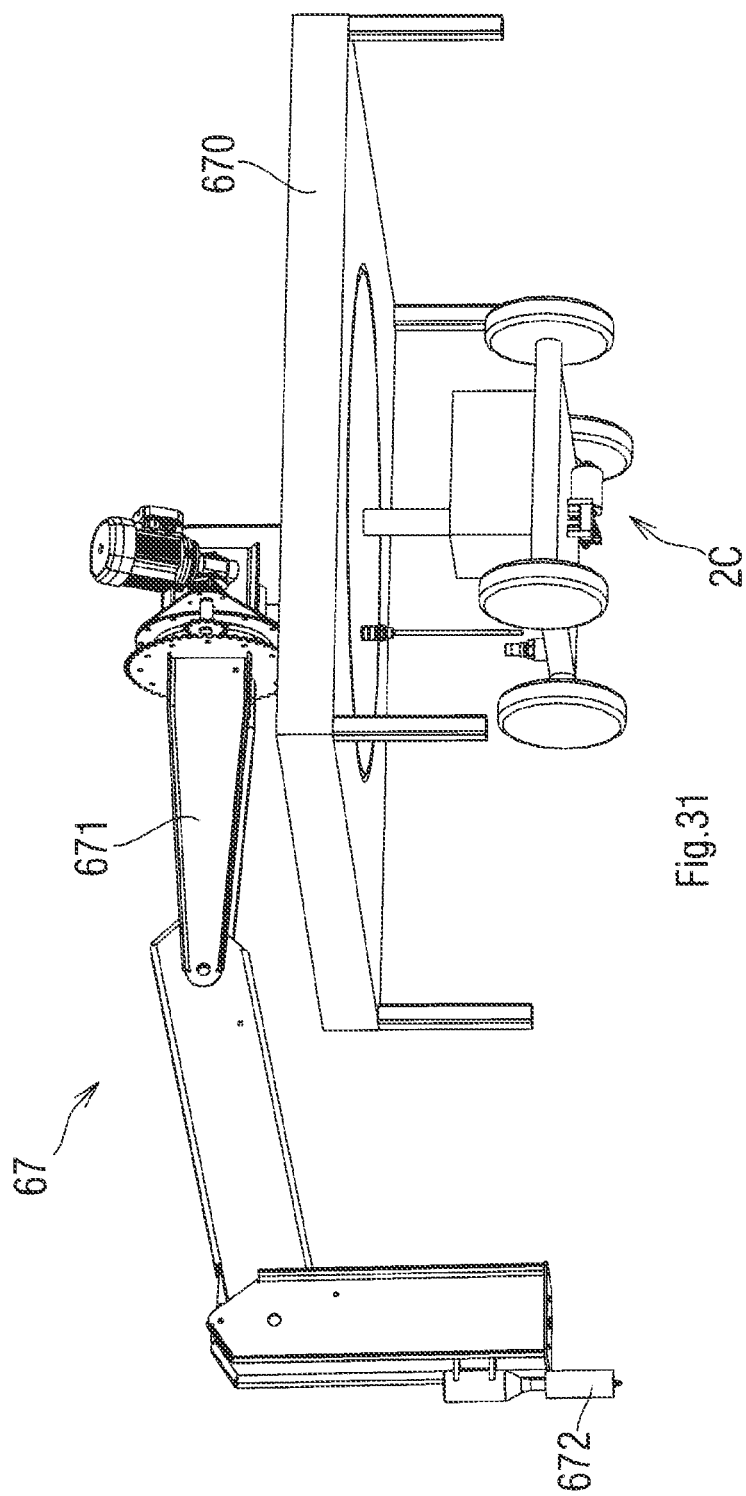
FIG. 31 shows a sampling device installed on a remote controlled module in accordance with FIG. 27.

FIG. 31 shows a sampling device 67 carried by a module 6c as described above.

The sampling device comprises a horizontal wall 670 carried by feet and provided with a mounting indentation, a robotic arm fixed to the horizontal wall 670 and a sampler 672 carried by the robotic arm. The robotic arm comprises a turret and several arm segments motorised and articulated one to another. The proximal arm segment is carried by the turret. The distal arm segment carries the sampler 672 at its free end.

This sampling device is provided in order to remove samples from the litter for analysis.

Figure 32:
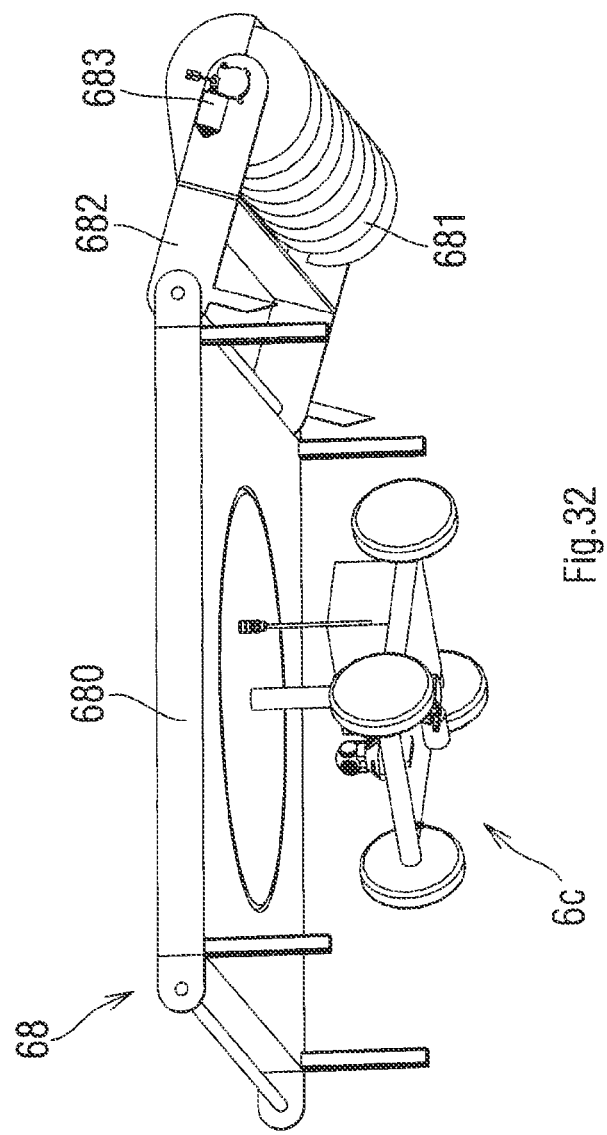
FIG. 32 is a view of a device 68 that is capable of collecting silage scattered by the animals at the consumption site.

FIG. 32 shows a device 68 carried by a module 6c such as that described above. This device is capable of collecting silage scattered by the animals at the site of consumption. This device comprises a horizontal wall 680 carried by feet, provided with a mounting indentation and at least one worm screw 681 carried by two arms 682 articulated on the wall 680. The worm screw is coupled in rotation to a drive motor 683. The worm screw 681 is transverse to the direction of advance of the device facing the silage consumption site. The screw is brought into contact with the ground and by rotation of the screw, silage is pushed towards the site or area of consumption.

A remote controlled module for moving on the ground provided with a spreading jet and a small capacity reservoir of spreading product provided for replenishment by a product delivery means may also be provided, transported by the monitoring unit 1 and connected via a flexible pipe to a dedicated supply outside the rearing premises.

A transportable calibration unit for calibrating the various sensors both of the premises and of the monitoring unit 1 may be associated with the monitoring and intervening assembly as described. With a unit of this type, it will be possible to calibrate the sensors of various rearing premises and various monitoring units.

A module 2d for spreading litter products which can be separated from the monitoring unit 1 has been described above, but in a variation, this module is permanently fixed to said monitoring unit 1.

In addition, the various modules will have lockable and unlockable coupling means so that they can be coupled to other modules.

The monitoring unit 1 in accordance with the invention will advantageously be equipped with means for detecting the presence of human beings in the rearing premises. Such means may be constituted by one or more cameras coupled to artificial intelligence software which can distinguish the presence of a human being from livestock. In the case of detection of such a presence, the module or modules that are moving will be stopped and deactivated.

Detection of such a presence could trigger an alarm, and in this manner, any unauthorised intrusion into the premises will be indicated to the farmer.

The monitoring assembly in accordance with the invention has the advantage of being able to interact with the animals and with individuals entering the rearing premises. In addition, this rearing assembly is capable of acting without delay on the system managing the environment of the building in order to correct a problem with the environment or something else. Typically but in a non-limiting manner, a system of this type comprises one or more fans, one or more air extractors, one or more appliances for disinfecting air, or one or more air filtration appliances.

By handling products pneumatically in particular, a plurality of products can be distributed simultaneously either by the jet 23, the lance 26 or another spreading element carried by the module 2g. These products may be solids, liquids or gases, or a mixture thereof. Certain gases used could have remedial properties or disinfecting properties. In the case of these latter gases, they may in particular be used to disinfect the rearing premises and its equipment as well as to disinfect the pipes for transporting feed products.

Because of the cameras and images provided thereby, the remote controlled modules can be operated and controlled remotely by the processing unit 3. Because of the cameras in particular, it becomes possible to identify problems which may arise in the flock as a whole or in a group of animals or in one animal in particular. Animals that are always standing up may be a consequence of locally wet litter. In that case, the monitoring and intervening assembly in accordance with the invention is capable of measuring the temperature of the litter and optionally of its moisture content and of operating and controlling an operation for spreading drying products or fresh litter.

Similarly, because of the cameras and the images they provide and their analyses, the operations for distributing food rations to the feeders may be carried out in the background. More precisely, while supplying a feeder with a feed product, it can analyse the need for feed product in another feeder.

Irrespective of the problem which is detected, the monitoring and intervening assembly will alert the farmer using any known means. The farmer could then, if desired, control the required interventions or prohibit any intervention.

The monitoring assembly is also capable of examining the faeces of animals and of evaluating their state of health.

Finally, the monitoring and intervening assembly integrates self-diagnostic functions and is capable of monitoring the correct function of the equipment of the rearing premises.

Figure 33:
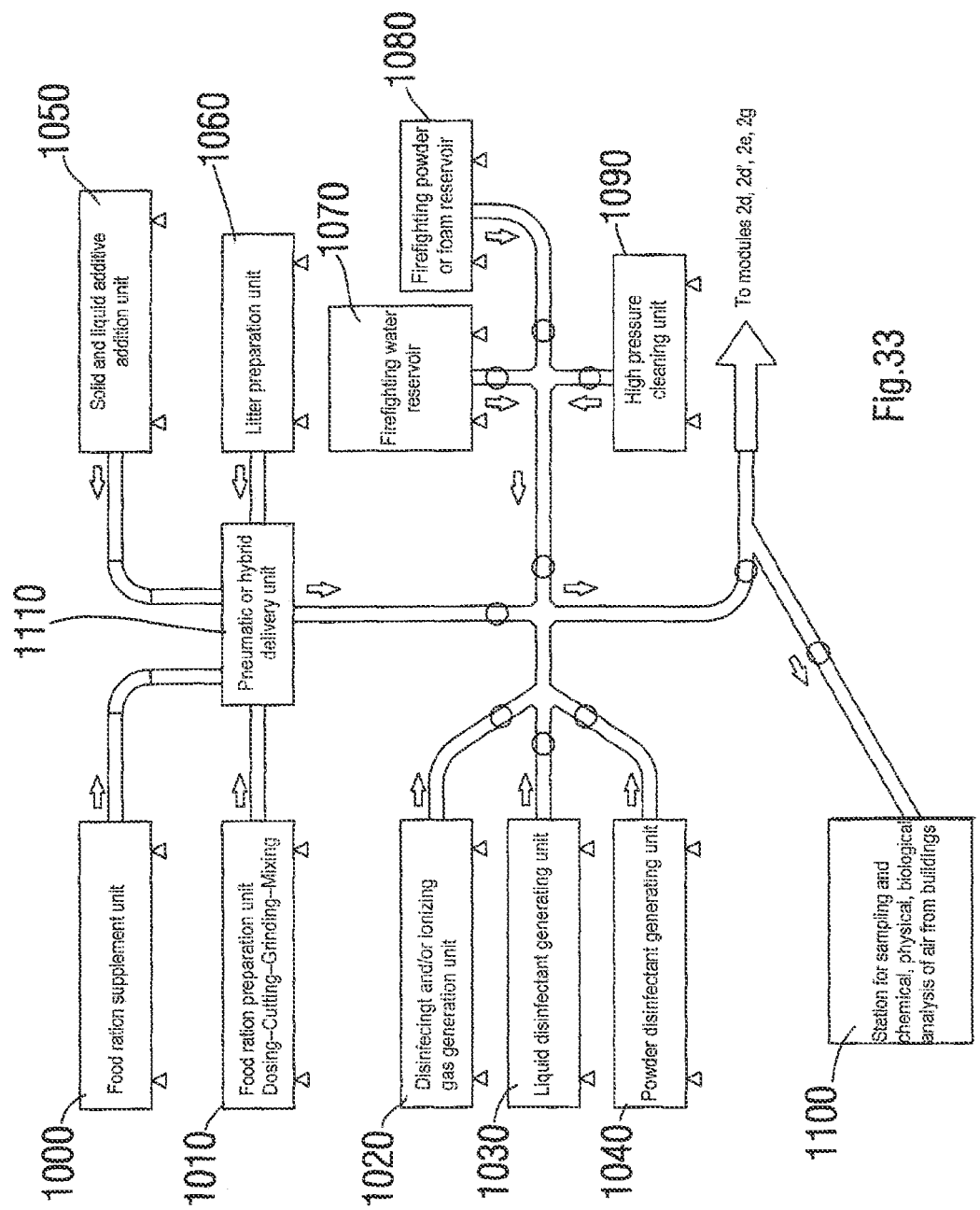

The monitoring assembly as described advantageously comprises a plurality of functional units which are capable of supplying the intervening modules 2d, 2d', 2e, 2g with solid, gaseous or liquid products and in particular of analysing the ambient air of the premises and the emanations produced in the premises, in particular by litter, faeces etc. As can be seen in FIG. 33, the various functional units are each installed on a weighing means and are organised around the distribution or suction pipes with stop valves. FIG. 33 shows that the monitoring assembly comprises a unit 1000 which is capable of delivering supplements to the food ration, a unit 1010 for the preparation of food rations providing the functions of dosing, cutting, grinding and mixing, a unit 1020 for generating disinfectant and/or ionising gas, a unit 1030 for generating liquid disinfectant, a unit 1040 for generating disinfectant powder, a unit 1050 for adding solid and liquid additives, a unit 1060 for the preparation of litter, a unit 1070 forming a reservoir for firefighting water, a unit 1080 forming a reservoir for firefighting powder or foam, a high pressure cleaning unit 1090. It will also be seen that the monitoring assembly comprises a unit 1100 constituted by a station for the chemical, physical and biological aspiration and analysis of the air in the buildings and a unit 1110 for sending or propelling the products delivered by the units 1000, 1010, 1050 and 1060 to one of the active distribution modules 2d, 2d', 2e, 2g, the unit 1110 for propelling these products possibly employing pneumatic transport techniques or any other technique.

It should be noted that at least the station 1100 may be common to a plurality of monitoring and intervening assemblies.

Clearly, the present invention can accommodate any arrangement and variation from the range of equivalent techniques without in any way departing from the scope of the present invention as defined in the claims below. It is also clear that the present invention is not limited to the field of animal husbandry and that it may be used in industrial premises for carrying out monitoring and intervention tasks.

The invention claimed is:

1. A monitoring and intervening assembly for rearing premises comprising:
   a movable monitoring unit (1) equipped with means for monitoring the rearing premises and the animals resident therein, the geographical coordinates of said unit in the premises being determinable with respect to an origin,
   at least one movable intervening module (2a, 2b, 2c, 2d, 2e, 2f, 2g, 2h) which is capable of being driven and controlled by said monitoring unit (1), said intervening module, when inoperative, being installed in a storage area,
   said monitoring unit (1) and said intervening module (2a, 2b, 2c, 2d, 2e, 2f, 2g, 2h) both comprising cooperating mechanical coupling means for linking one to the other and which are lockable and unlockable, said monitoring unit being capable of continuously monitoring the premises and the animals without, however, being coupled to the or one of the intervening modules.

2. The assembly as claimed in claim 1, further comprising a processing unit (3) in communication with the monitoring unit (1), said processing unit (3) being capable of receiving data and signals emitted by at least the monitoring means comprised in the monitoring unit, of analyzing said data and signals, of establishing a diagnosis and, if appropriate, of operating the monitoring unit in order to manage an intervention.

3. The assembly as claimed in claim 1, wherein the monitoring unit 1 is suspended on a guide rail (4) installed above the ground, said monitoring unit (1) comprising means for driving along the guide rail (4), and the monitoring unit (1) comprises a means for indicating its position along the guide rail (4) with respect to a reference or origin mechanically attached to this rail (4).

4. The assembly as claimed in claim 3, wherein:
   the guide rail (4) is formed by a tubular profile with a quadrangular cross section and comprises a longitudinal slot (40) provided in a lower wall which forms two guide tracks (41) either side of the slot (40),
   the monitoring unit (1) comprises a chassis (10) in the form of a dolly to which the guide means (11) are fixed along the rail bearing on the guide tracks (41),
   said drive means is formed by a drive wheel (12) coupled to a drive motor means (13) attached to the chassis (10), said drive wheel (12) pressing via tread against the outer face of the lower wall of the guide rail (4),
   said drive wheel is formed by a central metal disk (120) clamped between two lateral flanges (121) the peripheral border of which forms the tread,
   the central disk (120) has a larger diameter than the diameter of the lateral flanges (121) and penetrates into the guide rail (4) by passing through the slot (40).

5. The assembly as claimed in claim 2, wherein the at least one monitoring means of the monitoring unit (1) comprises at least one image acquisition device (5) which can provide images of the premises and the animals resident therein, the processing unit (3) comprising image analysis means.

6. The assembly as claimed in claim 2, wherein said monitoring means are constituted by one or more means selected from: a sensor for the quantity of ammonia, a sensor for the quantity of carbon dioxide, a sensor for the quantity of oxygen, a temperature sensor, a moisture sensor, a light meter, an anemometer, a black ball type sensor, a sensor for dust, a microphone, a sound acquisition device, and an infrasound sensor.

7. The assembly as claimed in claim 4, wherein the coupling means comprised in the unit (1) is formed by an extensible pole (15) carried by the chassis (10) and actuated in deployment or in retraction by an actuating motor mechanism (16), this pole (15) comprising, at its lower end, means for docking the module (2) provided for cooperation by docking with complementary docking means carried by the or each module (2).

8. The assembly as claimed in claim 7, wherein the docking means comprises both a swivel hook (155) articulated on the chassis (10) of the monitoring unit (1) and associated with a manoeuvring motor means (156) carried by said monitoring unit 1, as well as a coupling ring (22) carried by the intervening module (2) and provided in order to receive the swivel hook (155) by form fitting, said intervening module (2) being suspended such that depending on whether the intervening module is in use or inoperative, the intervening module is either on the guide rail (4) or at a storage zone (45) adjacent to the rail (4), said storage zone being in communication with the rail (4) via a junction point (46).

9. The assembly as claimed in claim 7, wherein the monitoring unit (1) comprises strain gauges (17) installed between the chassis (10) of said unit (1) and the extensible vertical pole (15).

10. The assembly as claimed in claim 1, further comprising weighing modules (2a, 2b, 2c) each provided with a rigid horizontal plate (28a, 28b, 28c) and wherein the lower face of the plate of each weighing module receives at least one temperature sensor (C1), at least one moisture sensor (C2), and at least one sensor for analyzing the chemical composition of litter and faeces.

11. The assembly as claimed in claim 1, further comprising a spreading module (2d, 2d') supplied with products via a flexible pipe and wherein the spreading module comprises a means (23) for spreading and distribution formed by a jet carried by a rigid supply pipe (24) formed by two pipe segments, upstream (240) and downstream (241), connected together via a swivel joint (242), said jet (23) being connected to the downstream pipe segment (24) via an elastically deformable sleeve (230), a first motor means (231) being installed between the jet (23) and the downstream pipe segment (241) by being kinematically coupled thereto, and a second motor means (243) being coupled respectively to two pipe segments (240, 241) and this being either side of the swivel joint (242).

12. The assembly as claimed in claim 11, wherein the jet (23) for spreading and distribution is equipped with a thermal camera (244).

13. The assembly as claimed in claim 11, wherein the jet (23) receives, at the level of the discharge outlet, an articulated deflector (255) the inclination of which facing the discharge outlet is adjustable by means of a motor means (256).

14. The assembly as claimed in claim 13, comprising:
infrared type detectors disposed on the flexible pipe for supplying products, said detectors being capable of detecting bodies on fire or with a high temperature transported in said pipe in order to control manoeuvring of the deflector in the direction of closing the jet in the event of detection; and/or
an acoustic detector installed in the flexible product supply pipe, which is capable of detecting sounds produced by the passage of foreign bodies so that the deflector can be manoeuvred downwards in order to return these bodies to a receptacle carried by the jet below its discharge outlet.

15. The assembly as claimed in claim 11, further comprising a means for removing dust installed between the upstream rigid pipe segment (24) and the flexible product supply pipe.

16. The assembly as claimed in claim 11, further comprising an additional spreading module comprising a dolly for suspension on the guide rail (4) to which is attached, via a rigid pipe, the upper end of a telescopic lance (26) which can be orientated in azimuth and in inclination provided with motor means for retraction and deployment, said lance comprising a distal lance section and a proximal lance section.

17. The assembly as claimed in claim 1, further comprising at least one automotive remote controlled module (6a, 6b, 6c) provided to move over the ground of the rearing premises, said module (6a, 6b, 6c) comprising a chassis mounted on wheels bearing on the ground.

18. The assembly as claimed in claim 17, wherein one (6a, 6b) of the automotive remote controlled modules is provided with gripping claws (60) for collecting dead or injured animals, or is dedicated to collecting eggs and comprises two pick-up arms forming a V in the front zone and a platform for receiving eggs formed between the arms.

19. The assembly as claimed in claim 17, wherein one (6c) of the remote controlled modules is provided with a spreading jet and a reservoir of spreading product provided to be replenished via a product delivering means transported by the monitoring unit (1) and connected to a dedicated supply which is outside the rearing premises via a flexible pipe.

20. The assembly as claimed in claim 16, wherein the lance (26) is connected to a bypass valve (267) controlled by the processing unit (3), wherein one channel is connected to a product dedicated supply and wherein the other channel is connected to a vacuum pump (268) in communication with a gas analyzer.

21. The assembly as claimed in claim 11, wherein the spreading jet 23 is vertical.

22. The assembly as claimed in claim 1, further comprising telescopic pole (9) provided to receive different detachable tools.

23. The assembly as claimed in claim 1, further comprising a plurality of functional units which are capable of supplying the intervening modules (2d, 2d', 2e, 2g) with solid, gaseous or liquid products, and the assembly also comprises a unit (1000) that can deliver supplements to the food ration, a unit (1010) for preparing food rations providing the functions of dosing, cutting, grinding and mixing, a unit (1020) for generating a disinfectant and/or ionizing gas, a unit (1030) for generating a liquid disinfectant, a unit (1040) for generating a powdered disinfectant, a unit (1050) for adding solid and liquid additives, a unit (1060) for the preparation of litter, a unit (1070) forming a reservoir for firefighting water, a unit (1080) forming a reservoir of powder or foam for firefighting, a high pressure cleaning unit (1090), a unit (1100) constituted by a station for suction and chemical, physical and biological analysis of the air in the buildings and the emanations therefrom, and a unit (1110) for sending or propelling products delivered by the units (1000, 1010, 1050 and 1060) to one of the active distribution modules (2d, 2d', 2e, 2g).

24. The assembly as claimed in claim 1, wherein the monitoring unit (1) is towed by a cable forming an endless belt stretched between a driven pulley and a drive pulley coupled to detachable means for driving in rotation.

\* \* \* \* \*